US012725631B1

(12) United States Patent
Tang et al.

(10) Patent No.: US 12,725,631 B1
(45) Date of Patent: Sep. 1, 2026

(54) ACOUSTIC EVENT DETECTION CUSTOMIZATION

(71) Applicant: Amazon Technologies, Inc., Seattle, WA (US)

(72) Inventors: Qingming Tang, Waltham, MA (US); Qin Zhang, Boston, MA (US); Chieh-Chi Kao, Somerville, MA (US); Rong Chen, Boston, MA (US); Sripal Mehta, San Francisco, CA (US); Chao Wang, Newton, MA (US)

(73) Assignee: Amazon Technologies, Inc., Seattle, WA (US)

( * ) Notice: Subject to any disclaimer, the term of this patent is extended or adjusted under 35 U.S.C. 154(b) by 1031 days.

(21) Appl. No.: 17/853,587

(22) Filed: Jun. 29, 2022

(51) Int. Cl.
*G10L 25/78* (2013.01)

(52) U.S. Cl.
CPC ........ *G10L 25/78* (2013.01); *G10L 2025/783* (2013.01)

(58) Field of Classification Search
CPC .......................... G10L 25/78; G10L 2025/783
See application file for complete search history.

(56) References Cited

U.S. PATENT DOCUMENTS

2020/0143823 A1* 5/2020 Ahlberg .................. G10L 25/27
2022/0139371 A1* 5/2022 Sharifi .................... G10L 15/32
704/231
2023/0276263 A1* 8/2023 Rydén .................... G06N 3/098
455/414.1

* cited by examiner

*Primary Examiner* — Thomas H Maung
(74) *Attorney, Agent, or Firm* — Nicholson DeVos Webster & Elliott LLP

(57) ABSTRACT

Systems and methods for acoustic event detection customization include determining one or more acoustic event detection (AED) models to send to a device based on enrollment data, AED model usage data, and/or other data indicating a likelihood that an acoustic event will be detected utilizing the one or more AED models. Additionally, an activation schedule may be generated and utilized to determine when to activate and deactivate the one or more AED models.

20 Claims, 15 Drawing Sheets

ACOUSTIC EVENT DETECTION CUSTOMIZATION

BACKGROUND

Internet-of-things devices have become more common in homes and other environments. Some of these devices allow for detection of predefined sounds. Described herein are improvements in technology and solutions to technical problems that can be used to, among other things, enhance use of sound-detecting devices.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
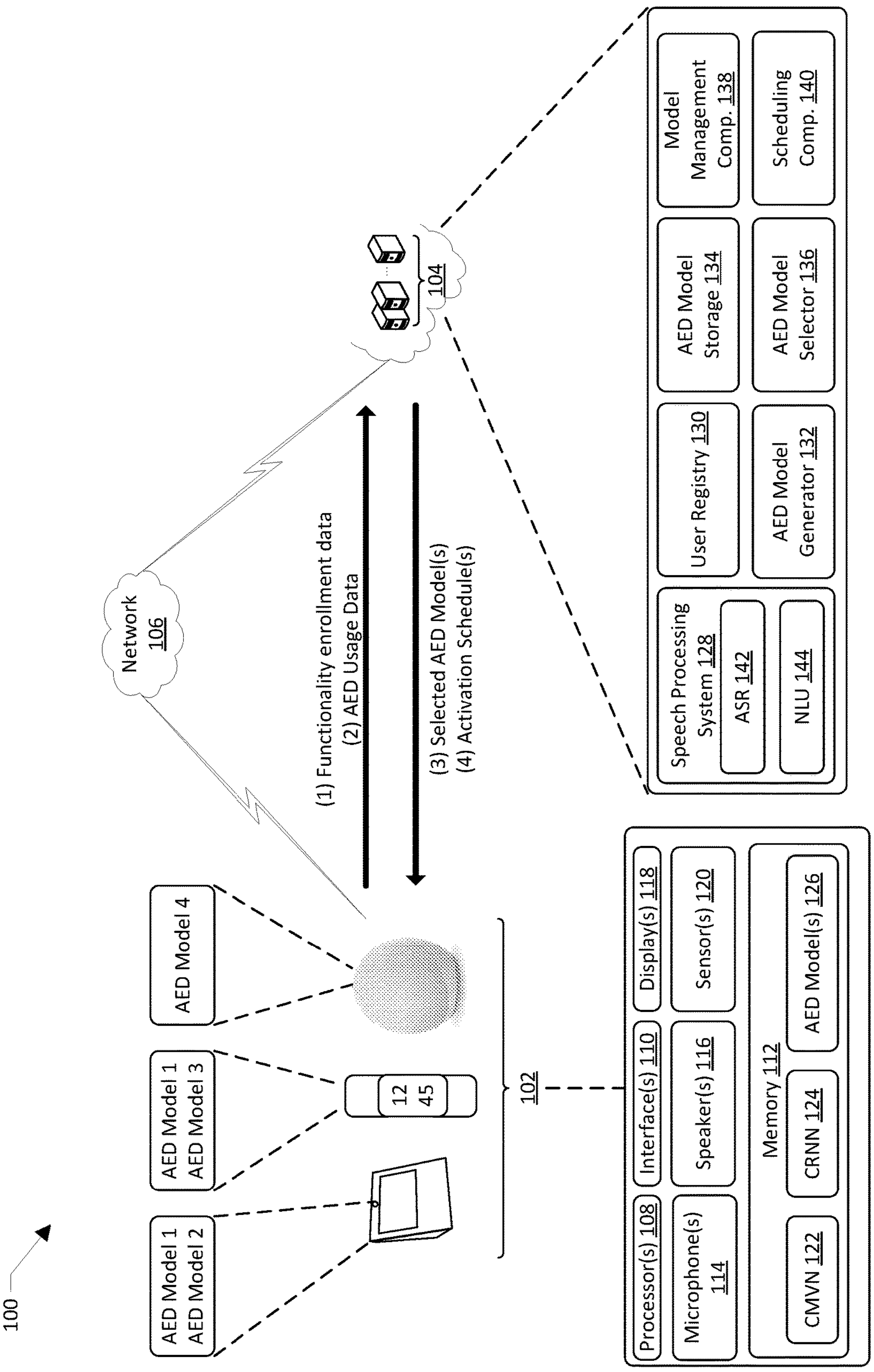
FIG. 1 illustrates a schematic diagram of an example environment for acoustic event detection (AED) customization.

Systems and methods for acoustic event detection (AED) customization are disclosed. Take, for example, an environment (such as a home, hotel, vehicle, office, store, restaurant, or other space) where one or more users may be present. The environments may include one or more electronic devices that may be utilized by the users or may otherwise be utilized to detect conditions associated with the environments. For example, the electronic devices may include voice interface devices (e.g., smart speaker devices, mobile phones, tablets, personal computers, televisions, appliances like refrigerators and microwaves, etc.), graphical interface devices (e.g., televisions, set top boxes, virtual/augmented reality headsets, etc.), wearable devices (e.g., smart watch, earbuds, healthcare devices), transportation devices (e.g., cars, bicycles, scooters, etc.), televisions and/or monitors, smart thermostats, security systems (including motion sensors and open/close sensors, including sensors that indicate whether a security system is armed, disarmed, or in a "hoe mode), smart cameras (e.g., home security cameras), and/or touch interface devices (tablets, phones, steering wheels, laptops, kiosks, billboard, other devices with buttons, etc.). These electronic devices may be situated in a home, in a place of business, healthcare facility (e.g., hospital, doctor's office, pharmacy, etc.), in a vehicle (e.g., airplane, truck, car, bus, etc.) in a public forum (e.g., shopping center, store, etc.), and/or at a hotel/quasi-public area, for example.

In these and other scenarios, some or all of the devices described herein may be configured with a microphone for capturing audio from an environment and for generating corresponding audio data. Additionally, the devices may be configured to process the audio data in one or more ways. Such processing may include performing automatic speech recognition on the audio data, performing natural language understanding techniques, performing entity recognition, beamforming, speaker recognition, etc. In addition to these types of speech processing, the devices may also be configured to perform acoustic event detection. While a more detailed description of AED is provided below with reference to the figures, generally AED involves analyzing sample audio data to determine if characteristics of the audio data correspond to characteristics of sounds of interest. For example, an AED model may be generated and configured to determine if sample audio data includes the sound of snoring, of glass breaking, of footsteps or otherwise sounds that indicate the presence of a person, the sound of water, of a dog barking, of an appliance noise such as a beep, of a smoke alarm, etc. While several example sounds have been provided above with each sound being associated with an AED model, it should be appreciated that a given environment may be associated with dozens, hundreds, and/or thousands of sounds that might be of interest to a given user, system, or otherwise. In some examples, AED associated with human sounds may include detection of certain user utterances such as wake words, certain words that are associated with predefined actions being performed by one or more devices, and/or other human-related sounds associated with causing a device to perform certain functionality. Additionally, AED may include "non-human AED" such as glass shattering, an appliance making a noise, that sound of a television, the sound of an animal making a noise, the sound of water, a smoke alarm beeping, a noise made external to a given environment, etc. In these and other examples, AED may include the detection of any given sound from audio data. Additional examples and details of AED types can be found at FIG. 14. However, to detect such sounds, each AED model is sent to and stored on one or more devices within the environment at issue, and each time audio is received at the device, the device engages in processing the corresponding audio data by querying each AED model for output indicating whether the sound associated with each AED model is detected. This process requires devices to store data representing each AED model and requires the devices to utilize all of the AED models on the device when audio is received.

It would be beneficial to customize which AED models are stored and utilized by given devices within an environment to reduce data storage on such devices and to reduce computational resources needed to process sample audio data. Additionally, it would be beneficial to intelligently determine when given AED models should and should not be utilized to detect associated acoustic events, further reducing computational resources. To achieve these and other benefits, an AED model generator may be configured to generate one or more AED models. As described herein, each AED model may be generated and trained to detect a given sound or set of sounds. To do so, each AED model may be configured to intake audio data representing sample audio. The audio data may be analyzed using the AED model to determine whether characteristics of the audio data correspond at least to a threshold degree to characteristics of reference audio data utilized to train the AED model. The AED model may be configured to output results data indicating whether the AED model detected the acoustic event that AED model was trained to detect. The system may also include an AED model storage that may be configured to store some or all of the AED models that are generated and trained as described herein. It should be understood that the number of AED models may range from just a few models to thousands of models depending on the system at issue. For example, some AED models may be "prebuilt," or otherwise may be associated with acoustic events that may be used across various devices in various environments. Examples of such prebuilt AED models may be models trained to detect glass breaking, snoring, user presence, etc. Additionally, some AED models may be "customized" or otherwise may be generated based on a single user's request to do so. For example, a given user may desire to receive notifications when one of multiple dogs in an environment bark, or in other words the user may desire to differentiate between a given dog barking and the other dogs in the environment. To do so, the system described herein may be configured to receive reference audio data of the dog at issue barking, and the system may utilize that reference audio data to train a customized AED model for detecting that dog's bark. It should be understood that at least some customized AED models may become prebuilt models based at least in part on applicability of the customized AED model to other user accounts.

Having generated and stored the AED models, an AED model selector may be configured to determine which AED models should be packaged and sent to given devices across multiple environments and/or multiple user accounts. To do so, the AED model selector may initially determine whether given user account data indicates that certain device functionalities associated with AED have been enrolled in. For example, a user may or may not have enrolled in presence detection functionality, security-related functionality, in-home-care functionality, environmental-condition-notification functionality, etc. These functionalities may each utilize AED at least in part to detect acoustic events in the environment at issue and to perform an action when such acoustic events are detected. For example, the presence detection functionality may be associated with running a routine to control smart home devices when user presence is or is not detected. The security-related functionality may include detection of glass breaking, which may indicate a security-related event for which a notification should be sent to a user device and/or emergency services. In these and other examples, the user may or may not have enrolled or otherwise indicated a desire to utilize these functionalities. The AED model selector may determine which functionalities the user account data at issue indicates have been enrolled in and may select an initial set of AED models to send to one or more devices associated with the user account data based at least in part on the functionality enrollment data. By so doing, the AED model selector may parse the AED models stored in the AED model storage such that only a subset of the AED models are selected to be sent to the one or more devices.

In some examples, the system may be configured to send the subset of AED models to all AED-enabled devices associated with the user account data at issue. In other examples, prior AED usage data may be utilized to determine which of the devices have previously detected acoustic events utilizing one or more AED models, and the subset of AED models may be sent to just those devices. Once the subset of the AED models is sent to and stored on the devices, AED model usage may be tracked over time. Take, for example, a scenario where a given environment includes two AED-enabled devices and each of the devices was sent the subset of AED models, which include two AED models each trained to detect a given acoustic event. The two devices may capture audio from the environment over time and the AED models may be utilized to detect when corresponding audio data includes certain acoustic events, such as over the course of four weeks. AED model usage data may be generated that indicates a number of acoustic events were detected using some or all of the AED models as well as when during the day such acoustic events were detected. In some examples, the AED model usage data may indicate that a first acoustic event was detected by a first device utilizing a first AED model multiple times over the four-week period. However, the AED model usage data may also indicate that the other AED model stored on the first device was not utilized to detect acoustic events. This AED model usage data may indicate that the first device is associated with user behavior and/or environmental conditions that are associated with the first acoustic event of the first AED model but not acoustic events associated with one or more other AED models stored on the device. In these examples, the AED model selector may utilize the AED model usage data to determine that the unused or infrequently used AED model(s) should be removed from the device at issue. A concrete example of this scenario may be that one device is situated in a bedroom of an environment and thus detects snoring frequently, while another device is situated in a bathroom of the environment and thus does not detect snoring or irregularly detects snoring. A model management component may then be utilized to send a command to the device at issue, which may cause the device to remove the AED model(s) from data storage of the device.

Additionally, determining which devices will include which of the subset of AED models may be based at least in part on contextual data associated with the devices. For example, the AED model selector may determine that the AED model usage data indicates two devices detect the same acoustic event at or near the same time frequently. This data may indicate that the two devices are located in the same room and thus are likely to detect the same acoustic events. In this example, one of the devices may be selected to maintain certain AED models while the other device may be selected to have the certain AED models removed, freeing up data storage and computational resources for that device. Data associated with the detected acoustic events, including confidence values associated with detection of the acoustic event(s), may be utilized to determine which device should maintain the AED model at issue. Additionally, attributes of the devices at issue may also be utilized to determine which device should maintain the AED model and which device should have the AED model removed. For example, each device may be queried for data indicating an amount of data storage being used by each device. This storage data may be utilized by the AED model selector to select the device with the most available storage to maintain the AED model. Additionally, device configuration data may be utilized to select which device should include the AED model. This configuration data may include indicators of hardware, firmware, software, and/or other components that may impact the device's ability to process audio data for AED. Furthermore, user account data indicating groupings or otherwise associations between devices may be utilized to determine which devices should maintain which AED models. For example, if two devices are associated with the same device group and/or if both devices include a portion of the same naming indicator (e.g., one device is named "kitchen light" and another is named "kitchen assistant") this may indicate that the devices are near each other and that both devices likely need not store the same AED model. In these and other examples, the AED model selector may receive data over time indicating conditions of the environment at issue, the devices at issue, the user account at issue, etc. and may utilize such data to dynamically determine which AED models should be stored on which devices. The model management component may be utilized to send commands to the various devices over time to cause those devices to maintain and/or remove certain AED models from data storage of the devices.

In addition to determining which models are to be maintained on various devices, a scheduling component may be configured to determine an activation schedule for the AED models. For example, the AED model usage data described herein may be utilized to determine a time or day and/or day of the week when a given AED model typically is used to detect an acoustic event. An example of this may be that an AED model trained to detect snoring detects snoring on a given device in a given environment most days of the week between 10:00 pm and 6:00 am. Given this AED model usage data, the scheduling component may be configured to generate data representing an activation schedule indicating that the AED model should be queried for detection of snoring only between 10:00 pm and 6:00 am. By so doing, the AED model is not queried each time AED is performed by the device, saving on computational resources used by the device during times when the activation schedule indicates the AED model should not be queried.

In addition to utilizing AED model usage data to determine the activation schedule described herein, the scheduling component may also be configured to determine when environmental conditions are associated with acoustic events and may utilize those environmental conditions as triggers for activation of AED models. For example, when an acoustic event is detected utilizing a given AED model, other data collected by the device at issue and/or other devices in the environment may be utilized to determine a correlation between the acoustic event and an environmental condition. An example of this may be that a certain smart home light is turned off typically 30 minutes to 1 hour before snoring is detected on a device. Given this correlation, the scheduling component may determine that the environmental condition of the light being turned off is a trigger for activating the snoring AED model on the device at issue. Other environmental conditions may be receipt of speech input on a voice interface device, control of other smart home devices, detection of other acoustic events, and/or any other environmental condition. In some examples, the condition may be that a wearable or otherwise mobile device enters the environment and that device includes AED models. In this example, the condition of the device entering the environment may cause one or more of the AED models as stored on one or more of the devices in the environment to activate or deactivate.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for AED customization. The system 100 may include, for example, one or more devices 102. In certain examples, the devices 102 may be a voice-enabled device (e.g., smart speaker devices, mobile phones, tablets, personal computers, etc.), a video interface device (e.g., televisions, set top boxes, virtual/augmented reality headsets, etc.), and/or a touch interface device (tablets, phones, laptops, kiosks, billboard, etc.). In examples, the devices 102 may be situated in a home, a place a business, healthcare facility (e.g., hospital, doctor's office, pharmacy, etc.), in vehicle (e.g., airplane, truck, car, bus, etc.), and/or in a public forum (e.g., shopping center, store, hotel, etc.), for example. The devices 102 may be configured to send data to and/or receive data from a system 104, such as via a network 106. It should be understood that where operations are described herein as being performed by the system 104, some or all of those operations may be performed by the devices 102. It should also be understood that anytime the system 104 is referenced, that system may include any system and/or device, whether local to an environment of the devices 102 or remote from that environment. Additionally, it should be understood that a given space and/or environment may include numerous devices 102. It should also be understood that when a "space" or "environment" is used herein, those terms mean an area and not necessarily a given room, building, or other structure, unless otherwise specifically described as such.

The devices 102 may include one or more components, such as, for example, one or more processors 108, one or more network interfaces 110, memory 112, one or more microphones 114, one or more speakers 116, one or more displays 118, and/or one or more sensors 120. The microphones 114 may be configured to capture audio, such as user utterances, and generate corresponding audio data. The speakers 116 may be configured to output audio, such as audio corresponding to audio data received from another device. The displays 118 may be configured to display images corresponding to image data, such as image data received from the system 104. The sensors 120 may be configured to detect an environmental condition associated with the devices 102 and/or the environment associated with the devices 102. Some example sensors 120 may include one or more microphones configured to capture audio associated with the environment in which the device is located, one or more cameras configured to capture images associated with the environment in which the device is located, one or more network interfaces configured to identify network access points associated with the environment, global positioning system components configured to identify a geographic location of the devices, Bluetooth and/or other short-range communication components configured to determine what devices are wirelessly connected to the device, device-connection sensors configured to determine what devices are physically connected to the device, user biometric sensors, and/or one or more other sensors configured to detect a physical condition of the device and/or the environment in which the device is situated. In addition to specific environmental conditions that are detectable by the sensors 120, usage data and/or account data may be utilized to determine if an environmental condition is present. Additionally, the memory 112 may include components such as a cepstral mean and variance normalization model (CMVN) 122, convolutional recurrent neural network (CRNN) 124, and/or one or more AED models 126. The CMVN 122 may be configured to normalize received audio data for AED processing. The CMVN 122 may minimize distortion caused by noise contamination for feature extraction by linearly transforming cepstral coefficients associated with the audio data to have the same segmental statistics. This may allow for maintaining a high degree of recognition accuracy over a wide variety of acoustic environments. In examples the CMVN 122 may be utilized to preprocess sample audio data, and to send the preprocessed audio data to the CRNN 124. The CRNN 124 may be configured to intake the preprocessed sample audio data and to query one or more of the AED models 126 to determine if the sample audio data includes acoustic events associated with the AED models 126. Additional details on the CRNN 124 and the use of the AED models 126 is provided below.

It should be understood that while several examples used herein include a voice-enabled device that allows users to interact therewith via user utterances, one or more other devices, which may not include a voice interface, may be utilized instead of or in addition to voice-enabled devices. In these examples, the device may be configured to send and receive data over the network 106 and to communicate with other devices in the system 100. As such, in each instance where a voice-enabled device is utilized, a computing device that does not include a voice interface may also or alternatively be used. It should be understood that when voice-enabled devices are described herein, those voice-enabled devices may include phones, computers, and/or other computing devices.

The system 104 may include components such as, for example, a speech processing system 128, a user registry 130, an AED model generator 132, an AED model storage 134, an AED model selector 136, a model management component 138, and/or a scheduling component 140. It should be understood that while the components of the system 104 are depicted and/or described as separate from each other in FIG. 1, some or all of the components may be a part of the same system. The speech processing system 128 may include an automatic speech recognition component (ASR) 142 and/or a natural language understanding component (NLU) 144. Each of the components described herein with respect to the system 104 may be associated with their own systems, which collectively may be referred to herein as the system 104, and/or some or all of the components may be associated with a single system. Additionally, the system 104 may include one or more applications, which may be described as skills. "Skills," as described herein may be applications and/or may be a subset of an application. For example, a skill may receive data representing an intent. For example, an intent may be determined by the NLU component 144 and/or as determined from user input via a computing device. Skills may be configured to utilize the intent to output data for input to a text-to-speech component, a link or other resource locator for audio data, and/or a command to a device, such as the devices 102. "Skills" may include applications running on devices, such as the devices 102, and/or may include portions that interface with voice user interfaces of devices 102.

In instances where a voice-enabled device is utilized, skills may extend the functionality of devices 102 that can be controlled by users utilizing a voice-user interface. In some examples, skills may be a type of application that may be useable in association with target devices 102 and may have been developed specifically to work in connection with given target devices 102. Additionally, skills may be a type of application that may be useable in association with the voice-enabled device and may have been developed specifically to provide given functionality to the voice-enabled device. In examples, a non-skill application may be an application that does not include the functionality of a skill. Speechlets, as described herein, may be a type of application that may be usable in association with voice-enabled devices and may have been developed specifically to work in connection with voice interfaces of voice-enabled devices. The application(s) may be configured to cause processor(s) to receive information associated with interactions with the voice-enabled device. The application(s) may also be utilized, in examples, to receive input, such as from a user of a personal device and/or the voice-enabled device and send data and/or instructions associated with the input to one or more other devices.

Additionally, the operations and/or functionalities associated with and/or described with respect to the components of the system 104 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

With respect to the system 104, the user registry 130 may be configured to determine and/or generate associations between users, user accounts, environment identifiers, and/or devices. For example, one or more associations between user accounts may be identified, determined, and/or generated by the user registry 130. The user registry 130 may additionally store information indicating one or more applications and/or resources accessible to and/or enabled for a given user account. Additionally, the user registry 130 may include information indicating device identifiers, such as naming identifiers, associated with a given user account, as well as device types associated with the device identifiers. The user registry 130 may also include information indicating user account identifiers, naming indicators of devices associated with user accounts, and/or associations between devices, such as the devices 102. The user registry 130 may also include information associated with usage of the devices 102. It should also be understood that a user account may be associated with one or more than one user profiles. It should also be understood that the term "user account" may be used to describe a set of data and/or functionalities associated with a given account identifier. For example, data identified, determined, and/or generated while using some or all of the system 100 may be stored or otherwise associated with an account identifier. Data associated with the user accounts may include, for example, account access information, historical usage data, device-association data, and/or preference data.

The speech-processing system 128 may be configured to receive audio data from the devices 102 and/or other devices and perform speech-processing operations. For example, the ASR component 142 may be configured to generate text data corresponding to the audio data, and the NLU component 144 may be configured to generate intent data corresponding to the audio data. In examples, intent data may be generated that represents the audio data, such as without the generation and/or use of text data. The intent data may indicate a determined intent associated with the user utterance as well as a payload and/or value associated with the intent. For example, for a user utterance of "turn on bedrooms lights," the NLU component 144 may identify a "smart home" intent. In this example where the intent data indicates an intent to cause a smart home device to operate, the speech processing system 128 may call one or more speechlets and/or applications to effectuate the intent. Speechlets, as described herein may otherwise be described as applications and may include functionality for utilizing intent data to generate directives and/or instructions. A speechlet of a smart home system may be designated as being configured to handle the intent of causing smart home devices to perform actions, for example. The smart home system may receive the intent data and/or other data associated with the user utterance from the NLU component 144, such as by an orchestrator of the system 104, and may perform operations to cause an action to be performed by the device in question, for example. The system 104 may generate audio data confirming that the action has been performed, such as by a text-to-speech component. The audio data may be sent from the system 104 to one or more of the devices 102.

The components of the system 100 are described below by way of example. For example, the AED model generator 132 may be configured to generate one or more AED models 126. As described herein, each AED model 126 may be generated and trained to detect a given sound or set of sounds. To do so, each AED model 126 may be configured to intake audio data representing sample audio. The audio data may be analyzed using CRNN 124 and the AED model 126 to determine whether characteristics of the audio data correspond at least to a threshold degree to characteristics of reference audio data utilized to train the AED model 126. The AED model 126 may be configured to output results data indicating whether the AED model 126 detected the acoustic event that AED model 126 was trained to detect. The system 104 may also include the AED model storage 134 that may be configured to store some or all of the AED models 126 that are generated and trained as described herein. It should be understood that the number of AED models 126 may range from just a few models to thousands of models depending on the system at issue. For example, some AED models 126 may be "prebuilt," or otherwise may be associated with acoustic events that may be universally used across various devices in various environments. Examples of such prebuilt AED models 126 may be models trained to detect glass breaking, snoring, user presence, etc. Additionally, some AED models 126 may be "customized" or otherwise may be generated based on a single user's request to do so. For example, a given user may desire to receive notifications when one of multiple dogs in an environment bark, or in other words the user may desire to differentiate between a given dog barking and the other dogs in the environment barking. To do so, the system 104 may be configured to receive reference audio data of the dog at issue barking, and the system 104 may utilize that reference audio data to train a customized AED model 126 for detecting that dog's bark. It should be understood that at least some customized AED models 126 may become prebuilt models based at least in part on applicability of the customized AED model 126 to other user accounts.

Having generated and stored the AED models 126, the AED model selector 136 may be configured to determine which AED models 126 should be packaged and sent to given devices 102 across multiple environments and/or multiple user accounts. To do so, the AED model selector 136 may initially determine whether given user account data indicates that certain device functionalities associated with AED have been enrolled in. For example, a user may or may not have enrolled in presence detection functionality, security-related functionality, in-home-care functionality, environmental-condition-notification functionality, etc. These functionalities may each utilize AED at least in part to detect acoustic events in the environment at issue and to perform an action when such acoustic events are detected. For example, the presence detection functionality may be associated with running a routine to control smart home devices when user presence is or is not detected. The security-related functionality may include detection of glass breaking, which may indicate a security-related event for which a notification should be sent to a user device and/or emergency services. In these and other examples, the user may or may not have enrolled or otherwise indicated a desire to utilize these functionalities. The AED model selector 136 may determine which functionalities the user account data at issue indicates have been enrolled in and may select an initial set of AED models 126 to send to one or more devices 102 associated with the user account data based at least in part on the functionality enrollment data. By so doing, the AED model selector 136 may parse the AED models 126 stored in the AED model storage 134 such that only a subset of the AED models 126 are selected to be sent to the one or more devices 102.

In some examples, the system 104 may be configured to send the subset of AED models 126 to all AED-enabled devices 102 associated with the user account data at issue. In other examples, prior AED usage data may be utilized to determine which of the devices 102 have previously detected acoustic events utilizing one or more AED models 126, and the subset of AED models 126 may be sent to just those devices 102. Once the subset of the AED models 126 is sent to and stored on the devices 102, AED model usage may be tracked over time. Take, for example, a scenario where a given environment includes two AED-enabled devices 102 and each of the devices 102 was sent the subset of AED models 126, which include two AED models 126 each trained to detect a given acoustic event. The two devices 102 may capture audio from the environment over time and the AED models 126 may be utilized to detect when the corresponding audio data includes certain acoustic events over a period of time, such as over the course of four weeks. AED model usage data may be generated that indicates a number of acoustic events were detected using some or all of the AED models 126 as well as when during the day such acoustic events were detected. In some examples, the AED model usage data may indicate that a first acoustic event was detected by a first device utilizing a first AED model multiple times over the four-week period. However, the AED model usage data may also indicate that the other AED model was not utilized to detect acoustic events over the four-week period. This AED model usage data may indicate that the device at issue associated with user behavior and/or environmental conditions that are associated with the first acoustic event of the first AED model being detected but not acoustic events associated with the other AED model stored on the device. In these examples, the AED model selector 136 may utilize the AED model usage data to determine that the unused or infrequently used AED model(s) 126 should be removed from the device 102 at issue. A concrete example of this scenario may be that one device is situated in a bedroom of an environment and thus detects snoring frequently, while another device is situated in a bathroom of the environment and thus does not detect snoring or irregularly detects snoring. The model management component 138 may then be utilized to send a command to the device 102 at issue, which may cause the device 102 to remove the AED model(s) 126 from data storage, such as the memory 112, of the device 102.

Additionally, determining which devices 102 will include which of the subset of AED models 126 may be based at least in part on contextual data associated with the devices 102. For example, the AED model selector 136 may determine that the AED model usage data indicates two devices 102 detect the same acoustic event at or near the same time frequently. This data may indicate that the two devices 102 are located in the same room and thus are likely to detect the same acoustic events. In this example, one of the devices 102 may be selected to maintain certain AED models 126 while the other device 102 may be selected to have the certain AED models 126 removed, freeing up data storage and computational resources for that device 102. Data associated with the detected acoustic events, including confidence values associated with detection of the acoustic event(s), may be utilized to determine which device 102 should maintain the AED model 126 at issue. Additionally, attributes of the devices 102 at issue may also be utilized to determine which device 102 should maintain the AED model 126 and which device 102 should have the AED model 126 removed. For example, each device 102 may be queried for data indicating an amount of data storage being used by each device 102. This storage data may be utilized by the AED model selector 136 to select the device 102 with the most available storage to maintain the AED model 126. Additionally, device configuration data may be utilized to select which device 102 should include the AED model 126. This configuration data may include indicators of hardware, firmware, software, and/or other components that may impact the device's ability to process audio data for AED. Furthermore, user account data indicating groupings or otherwise associations between devices 102 may be utilized to determine which devices 102 should maintain which AED models 126. For example, if two devices 102 are associated with the same device group and/or if both devices 102 include a portion of the same naming indicator (e.g., one device is named "kitchen light" and another is named "kitchen assistant") this may indicate that the devices 102 are near each other and that both devices 102 likely need not store the same AED model 126. In these and other examples, the AED model selector 136 may receive data over time indicating conditions of the environment at issue, the devices at issue, the user account at issue, etc. and may utilize such data to dynamically determine which AED models 126 should be stored on which devices 102. The model management component 138 may be utilized to send commands to the various devices 102 over time to cause those devices 102 to maintain and/or remove certain AED models 126 from data storage of the devices 102. In examples, instead of an AED model 126 being deleted from a device as described herein, the AED models 126 may be stored in flash memory and not transitioned to other storage media that the device 102 utilizes to detect acoustic events.

In addition to determining which models are to be maintained on various devices, the scheduling component 140 may be configured to determine an activation schedule for the AED models 126. For example, the AED model usage data described herein may be utilized to determine a time of day and/or day of the week when a given AED model 126 typically is used to detect an acoustic event. An example of this may be that an AED model 126 trained to detect snoring detects snoring on a given device 102 in a given environment most days of the week between 10:00 pm and 6:00 am. Given this AED model usage data, the scheduling component 140 may be configured to generate data representing an activation schedule indicating that the AED model 126 should be queried for detection of snoring only between 10:00 pm and 6:00 am. By so doing, the AED model 126 is not queried each time AED is performed by the device 102, saving on computational resources used by the device 102 during times when the activation schedule indicates the AED model 126 should not be queried.

In addition to utilizing AED model usage data to determine the activation schedule described herein, the scheduling component 140 may also be configured to determine when environmental conditions are associated with acoustic events and may utilize those environmental conditions as triggers for activation of AED models 126. For example, when an acoustic event is detected utilizing a given AED model 126, other data collected by the device at issue and/or other devices in the environment may be utilized to determine a correlation between the acoustic event and an environmental condition. An example of this may be that a certain smart home light is turned off typically 30 minutes to 1 hour before snoring is detected on a device 102. Given this correlation, the scheduling component 140 may determine that the environmental condition of the light being turned off is a trigger for activating the snoring AED model 126 on the device 102 at issue. Other environmental conditions may be receipt of speech input on a voice interface device, control of other smart home devices, detection of other acoustic events, and/or any other environmental condition, for example. In some examples, the condition may be that a wearable or otherwise mobile device enters the environment and that device includes AED models 126 that are utilized by one or more of the devices situated in the environment. In this example, the condition of the device entering the environment may cause one or more of the AED models 126 as stored on one or more of the devices 102 in the environment to activate or deactivate.

It should be understood that the scheduling component 140 may include any trigger or trigger type for activation or deactivation of a given AED model 126. In addition to the examples above, other examples of AED model activation and/or deactivation may include states of other devices. For example, a device may be in an away state, a home state, etc. These device states may be associated with when an AED model should be activated or not. By way of example, an AED model trained to detect footsteps may be activated when the device is in an away state but not when the device is in a home state. By way of an additional example, the triggers for AED model activation may include data received from an external device. For example, an AED model trained to detect the sound of thunder may be activated when data is received indicating that thunderstorms are likely in an area where the device in question is present, an AED model trained to detect sound from a delivery truck may be activated when data is received indicating that an online order includes details indicating a delivery is to be made on the day in question, an AED model trained to detect a doorbell chime when data is received indicating motion was detected at a smart doorbell, an AED model trained to detect the sound of crying when a smart watch or other device detects a fall event, etc. Also, as described herein, detection of a given sound utilizing a first AED model may be a trigger for the activation or deactivation of another AED model. For example, an AED model trained to detect the sound of thunder may detect the sound of thunder, and that detection may cause an AED model trained to detect the sound of a dog barking to be activated. In another example, an AED model trained to detect the sound of a door opening may trigger the same or a different AED model trained to detect the second of a door closing to be activated, and when the door closing sound is not detected may cause an action to be performed, such as the sending of a reminder to close the door.

By utilizing the techniques described herein, as shown in FIG. 1., one of the devices 102 may be caused to store and utilize AED Model 1 and AED Model 2, another of the devices 102 may be caused to store and utilize AED Model 1 and AED Model 3, and yet another of the devices 102 may be caused to store and utilize AED Model 4, all in the same environment. Additionally, each of these AED models 126 may be associated with an activation schedule that indicates when the devices 102 are to utilize the AED models 126 to detect acoustic events.

As used herein, the one or more models and/or the components responsible for detecting acoustic events and/or for determining which AED models 126 should be stored on given devices and/or for generating AED model activation schedules may utilize machine learning techniques. For example, the machine learning models as described herein may include predictive analytic techniques, which may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases and may be utilized to predict trends and behavior patterns. In examples, the event, otherwise described herein as an outcome, may be an event that will occur in the future, such as whether presence will be detected. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome. Then, data may be collected and/or accessed to be used for analysis.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter, predictive modelling may be performed to generate accurate predictive models for future events. Outcome prediction may be deterministic such that the outcome is determined to occur or not occur. Additionally, or alternatively, the outcome prediction may be probabilistic such that the outcome is determined to occur to a certain probability and/or confidence.

It should be noted that while text data is described as a type of data utilized to communicate between various components of the system 104 and/or other systems and/or devices, the components of the system 104 may use any suitable format of data to communicate. For example, the data may be in a human-readable format, such as text data formatted as XML, SSML, and/or other markup language, or in a computer-readable format, such as binary, hexadecimal, etc., which may be converted to text data for display by one or more devices such as the devices 102.

As shown in FIG. 1, several of the components of the system 104 and the associated functionality of those components as described herein may be performed by one or more of the devices 102. Additionally, or alternatively, some or all of the components and/or functionalities associated with the devices 102 may be performed by the system 104.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 108 and/or the processor(s) described with respect to the components of the system 104, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 108 and/or the processor(s) described with respect to the components of the system 104 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 108 and/or the processor(s) described with respect to the components of the system 104 may possess its own local memory, which also may store program components, program data, and/or one or more operating systems.

The memory 112 and/or the memory described with respect to the components of the system 104 may include volatile and nonvolatile memory, removable and non-removable media implemented in any method or technology for storage of information, such as computer-readable instructions, data structures, program component, or other data. Such memory 112 and/or the memory described with respect to the components of the system 104 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 112 and/or the memory described with respect to the components of the system 104 may be implemented as computer-readable storage media ("CRSM"), which may be any available physical media accessible by the processor(s) 108 and/or the processor(s) described with respect to the system 104 to execute instructions stored on the memory 112 and/or the memory described with respect to the components of the system 104. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 112 and/or the memory described with respect to the components of the system 104, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

The network interface(s) 110 and/or the network interface (s) described with respect to the components of the system 104 may enable messages between the components and/or devices shown in system 100 and/or with one or more other polling systems, as well as other networked devices. Such network interface(s) 110 and/or the network interface(s) described with respect to the components of the system 104 may include one or more network interface controllers (NICs) or other types of transceiver devices to send and receive messages over the network 106.

For instance, each of the network interface(s) 110 and/or the network interface(s) described with respect to the components of the system 104 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 110 and/or the network interface(s) described with respect to the components of the system 104 may include a wide area network (WAN) component to enable message over a wide area network.

In some instances, the system 104 may be local to an environment associated the devices 102. For instance, the system 104 may be located within one or more of the devices 102. In some instances, some or all of the functionality of the system 104 may be performed by one or more of the devices 102. Also, while various components of the system 104 have been labeled and named in this disclosure and each component has been described as being configured to cause the processor(s) to perform certain operations, it should be understood that the described operations may be performed by some or all of the components and/or other components not specifically illustrated. It should be understood that, in addition to the above, some or all of the operations described herein may be performed on a phone or other mobile device and/or on a device local to the environment, such as, for example, a hub device and/or edge server in a home and/or office environment, a self-driving automobile, a bus, an airplane, a camper, a trailer, and/or other similar object having a computer to perform its own sensor processing, etc.

Figure 2:
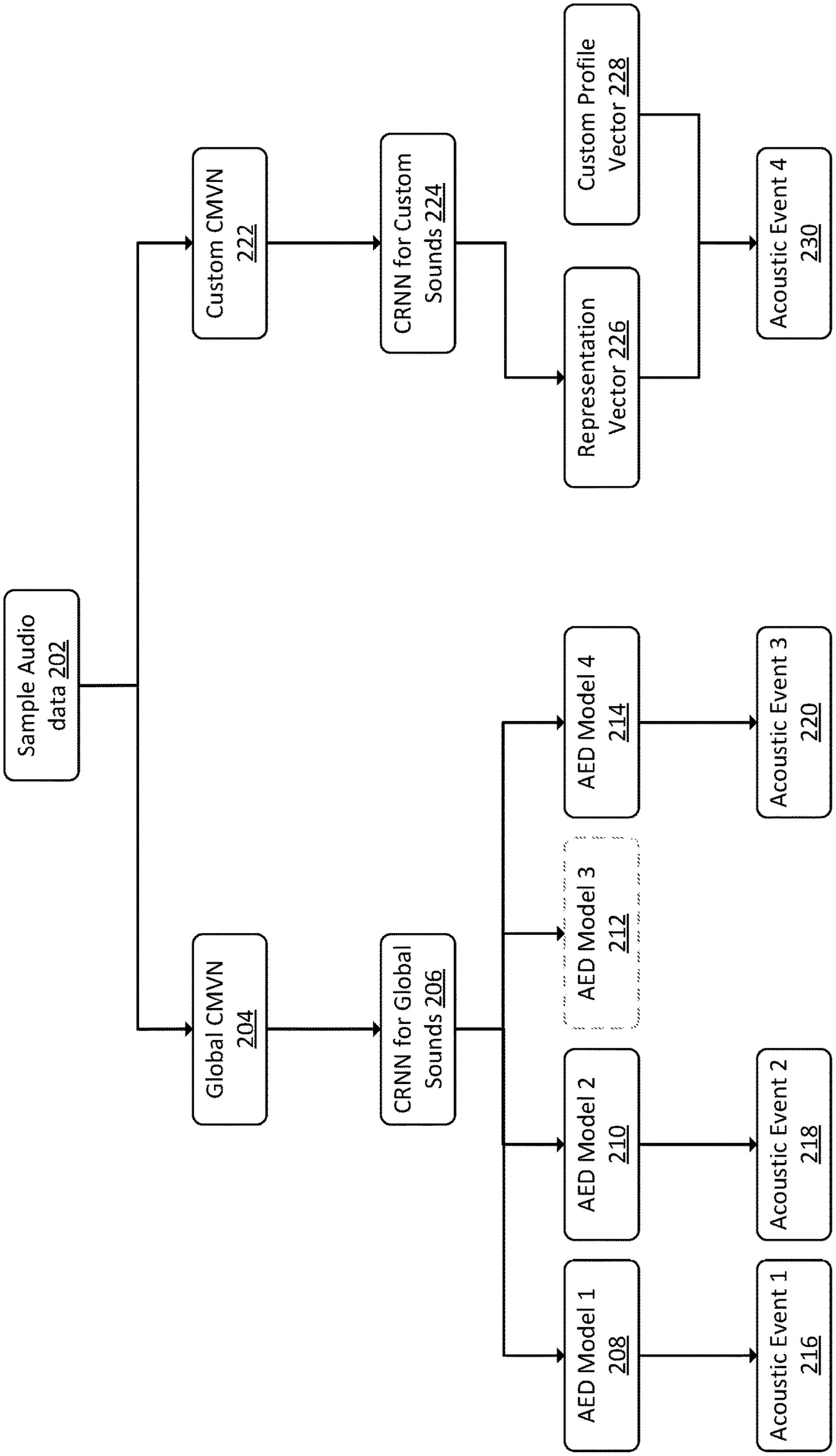
FIG. 2 illustrates a conceptual diagram of example components utilized for AED customization.

FIG. 2 illustrates a conceptual diagram of example components utilized for AED customization. Some of the components of FIG. 2 may be the same or similar to the components described with respect to FIG. 1. For example, FIG. 2 may include various AED models 126. Additionally, FIG. 2 may include sample audio data 202, a global CMVN 204, a CRNN for global sounds 206, AED models 1-4 208-214, indicators of acoustic events 216-220, a custom CMVN 222, a CRNN for custom sounds 224, a representation vector 226 of sample audio data, a custom profile vector 228, and/or an indicator of a custom acoustic event 230.

For example, audio may be captured by a device and the sample audio data 202 may be generated from the captured audio. In some examples, the device may be configured to attempt detection of acoustic events from prebuilt AED models and/or from custom AED models. When at least one prebuilt AED model is stored on the device at issue, the global CMVN 204 may be utilized to preprocess the sample audio data. As described above, the global CMVN 204 may be configured to normalize received audio data for AED processing. The global CMVN 204 may minimize distortion caused by noise contamination for feature extraction by linearly transforming cepstral coefficients associated with the sample audio data 202 to have the same segmental statistics. This may allow for maintaining a high degree of recognition accuracy over a wide variety of acoustic environments. In FIG. 2, the global CMVN 204 may be configured to preprocess the sample audio data 202 specific to the prebuilt AED models described herein. In examples, the global CMVN 204 may be utilized to preprocess sample audio data, and to send the preprocessed audio data to the CRNN for global sounds 206.

The CRNN for global sounds 206 may receive the sample audio data 202 as preprocessed by the global CMVN 204 and may be configured to determine if an AED event is present in the sample audio data 202. To do so, the CRNN for global sounds 206 may query one or more of the AED models residing on the device. For example, in FIG. 2, the device at issue includes AED Model 1 208, AED Model 2 210, and AED Model 4 214. Of note, while AED Model 3 212 was available to be stored on the device at issue, the AED model selection operations described herein resulted, in this example, in AED Model 3 212 not being stored on the device. In other examples, AED Model 3 212 may be stored on the device but an activation schedule associated with AED Model 3 212 may indicate that AED Model 3 212 should not be queried at the time when the sample audio data 202 was generated.

As shown in FIG. 2, AED Model 1 208 may be utilized by the CRNN for global sounds 206 to determine whether Acoustic Event 1 216 is detected from the sample audio data 202. Likewise, AED Model 2 210 may be utilized to determine whether Acoustic Event 2 218 is detected, and AED Model 4 214 may be utilized to determine whether Acoustic Event 3 220 is detected. Each of the called models may return results data indicating whether the corresponding acoustic event was detected and, in examples, a confidence value for detection of the acoustic events.

In addition to the prebuilt AED models described herein, one or more custom AED models may also be associated with a given device. In these examples, a custom CMVN 222 may be utilized to preprocess the sample audio data 202. The customer CMVN 222 may be specific to the custom AED model to which it corresponds, and the preprocessed sample audio data 202 may be provided to the CRNN for custom sounds 224. As described above, the CRNN for custom sounds 224 may utilize a representation vector 226 of the sample audio data 202 in association with a custom profile vector 228 for the custom acoustic event to determine if characteristics of the sample audio data 202 correspond to characteristics of the custom acoustic event. In the example of FIG. 2, the customer acoustic event may be Acoustic Event 4 230, and the customer AED model may be configured to detect Acoustic Event 4 230 as described herein.

Figure 3:
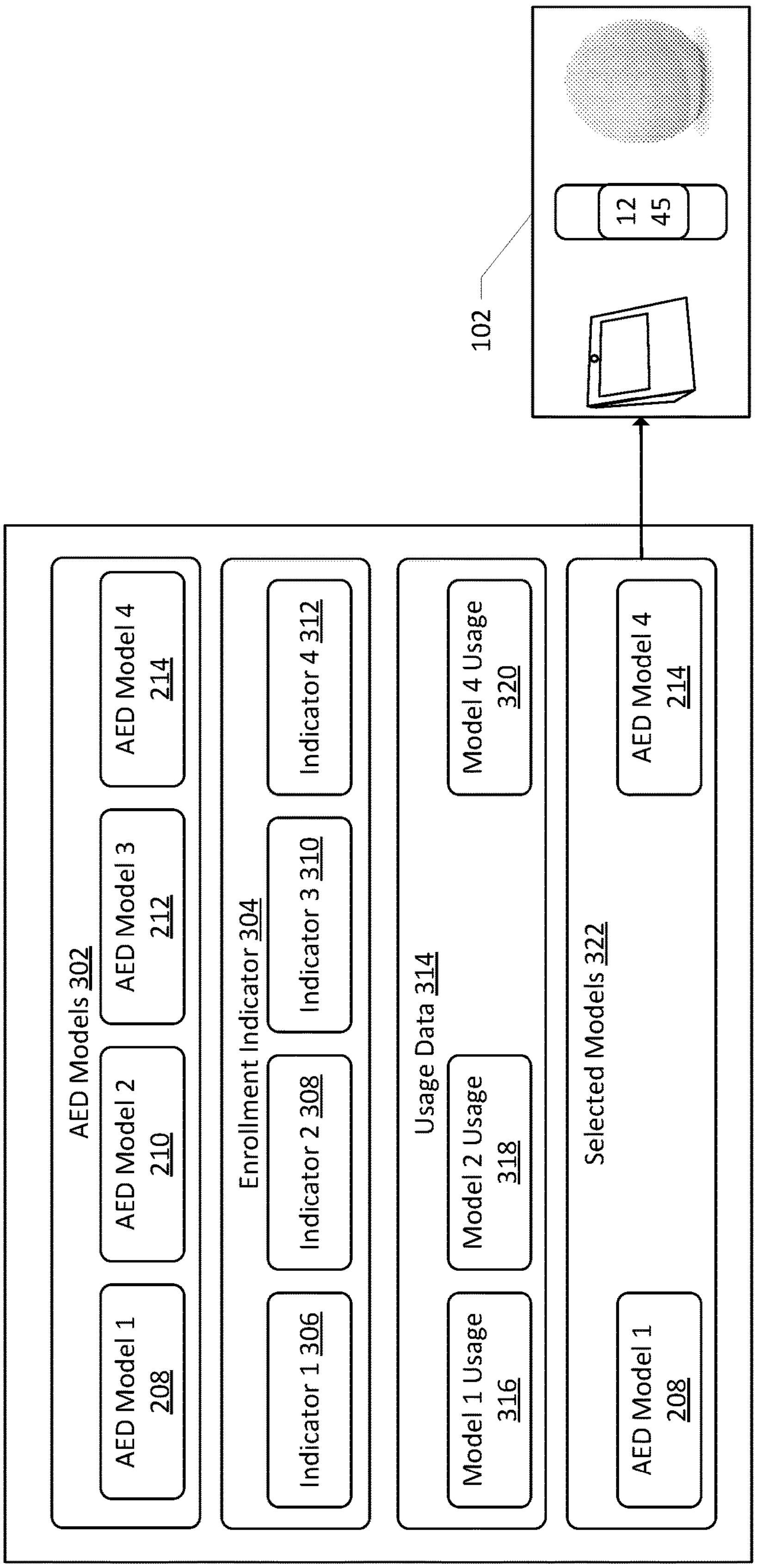
FIG. 3 illustrates a conceptual diagram of example data and components for selecting which AED models to associate with a given device.

FIG. 3 illustrates a conceptual diagram of example data and components for selecting which AED models to associate with a given device. FIG. 3 may include some of the sample components described with respect to FIG. 1 and FIG. 2. For example, AED-enabled devices such as devices 102 from FIG. 1 may be included in FIG. 3. Additionally, AED Model 1 208, AED Model 2 210, AED Model 3 212, and AED Model 4 214 from FIG. 2 may be included in FIG. 3. FIG. 3 may also include a corpus of AED models 302 (which may be the same or similar to the AED models 126 described with respect to FIG. 1), enrollment indicators 304 including Indicator 1 306, Indicator 2 308, Indicator 3 310, and Indicator 4 312, usage data 314 including Model 1 Usage 316, Model 2 Usage 318, and Model 4 Usage 320, and/or one or more selected models 322.

For example, as described above, an AED model generator may be configured to generate one or more AED models 302. As described herein, each AED model 302 may be generated and trained to detect a given sound or set of sounds. To do so, each AED model 302 may be configured to intake audio data representing sample audio. The audio data may be analyzed using the AED model 302 to determine whether characteristics of the audio data correspond at least to a threshold degree to characteristics of reference audio data utilized to train the AED model 302. The AED model 302 may be configured to output results data indicating whether the AED model 302 detected the acoustic event that AED model 302 was trained to detect. The system may also include an AED model storage that may be configured to store some or all of the AED models 302 that are generated and trained as described herein. It should be understood that the number of AED models 302 may range from just a few models to thousands of models depending on the system at issue. For example, some AED models 302 may be "prebuilt," or otherwise may be associated with acoustic events that may be universally used across various devices in various environments. Examples of such prebuilt AED models 302 may be models trained to detect glass breaking, snoring, user presence, etc. Additionally, some AED models 302 may be "customized" or otherwise may be generated based on a single user's request to do so. For example, a given user may desire to receive notifications when one of multiple dogs in an environment bark, or in other words the user may desire to differentiate between a given dog barking and the other dogs in the environment.

As shown in FIG. 3, enrollment data 304 may be acquired for some or all of the AED models 302 at issue. The enrollment data 304 may indicate whether user account data at issue indicates that functionality associated with each AED model 302 is enabled. For example, Indicator 1 306 may represent that the user account data indicates enrollment in use of AED Model 1 208, Indicator 2 308 may represent that the user account data indicates enrollment in use of AED Model 2 210, Indicator 3 310 may represent that the user account data indicates a lack of enrollment in the use of AED Model 3 212, and Indicator 4 312 may represent that the user account data indicates enrollment in use of AED Model 4 214. While the enrollment indicators 304 may take any form, an example of such indicators may be a "0" when user account data indicates no enrollment in use of a given AED model 302 and a "1" when user account data indicates enrollment in use of a given AED model 302.

Additionally, as described herein, usage data 314 may indicate how and when the AED models 302 are utilized by the device at issue. As described in more detail with respect to FIG. 1, the usage data 314 may indicate that the device at issue utilizes AED Model 1 208 at least a threshold number of times during a period of time based at least in part on Model 1 Usage 316. The same may be true for AED Model 4 214 as indicated by Model 4 Usage 320. However, Model 2 Usage 318 may indicate that AED Model 2 210 did not produce results indicating detection of an acoustic event. In this example, an AED model selector may be configured to utilize the usage data 314 to determine that AED Model 2 210 should be removed from the device.

As such, utilizing the techniques described above, the selected models 322 may include AED Model 1 208 and AED Model 4 214 based at least in part on the enrollment data 304 and the usage data 314 described above. These models may be packaged and sent to the device(s) 102 for use by the devices in detecting corresponding acoustic events.

Figure 4A:
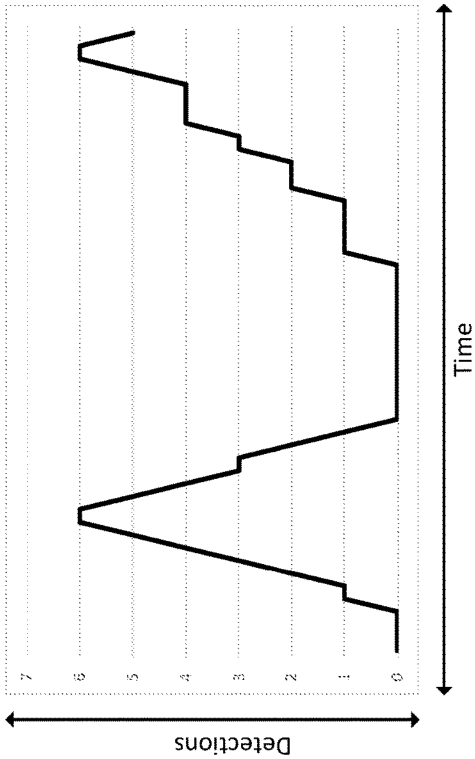
FIG. 4A illustrates a graph of AED model usage over time for a given device.

FIG. 4A illustrates a graph of AED model usage over time for a given device. The X-axis of FIG. 4A indicates passage of time, which may be over the course of several minutes, hours, days, weeks, and/or months. The Y-axis of FIG. 4A indicates a number of acoustic events detected in a given time range utilizing various AED models. In the example of FIGS. 4A-4D, four AED models are stored on and utilized by a given device, and usage data is presented in FIGS. 4A-D for each AED model. AED utilizing the first AED model is shown on the graph as squares, AED utilizing the second AED model is shown as diamonds, AED utilizing the third AED model is shown as triangles, and AED utilizing the fourth AED model is shown as circles.

Starting with the first AED model usage in FIG. 4A, the graph illustrates that detection of an acoustic event associated with the first AED model occurs cyclically where several events are detected (roughly 6 for each time interval) initially, then few events are detected, then again several events are detected (roughly 3-6 for each time interval), then again few events are detected, and lastly several events are detected again. This usage data may indicate that the first AED model associated with FIG. 4A is utilized to detect acoustic events on a cycle during certain times of the day and/or days of the week. This data may be utilized by a scheduling component as described above to determine an activation schedule for the first AED model. The activation schedule may indicate that the first AED model should be active during the times of the day and/or days of the week when several events were detected as indicated by the usage data.

Figure 4B:
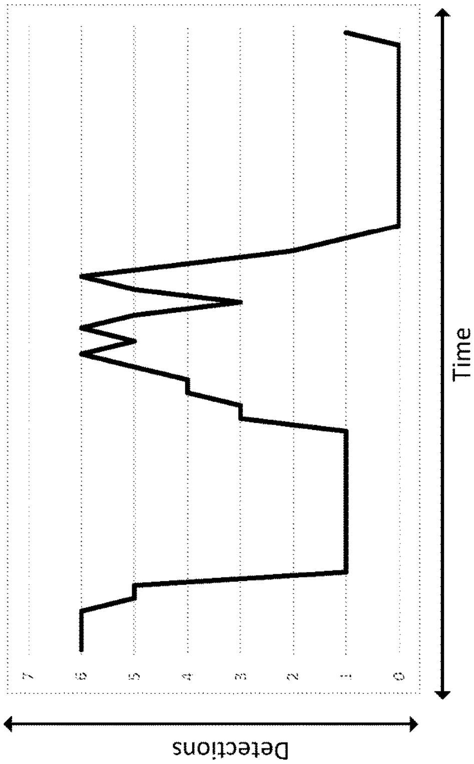
FIG. 4B illustrates another graph of AED model usage over time for a given device.

FIG. 4B illustrates usage of the second AED model, and the graph illustrates that detection of an acoustic event associated with the second AED model occurs at times that differ from when the first AED model detected its associated acoustic events. This usage data may be utilized to determine that the second AED model should be active when indicated by the usage data and/or when the first AED model is not active. By so doing, the activation schedule for a given AED model may be based on the activation schedules of other AED models instead of or in addition to usage data.

Figure 4C:
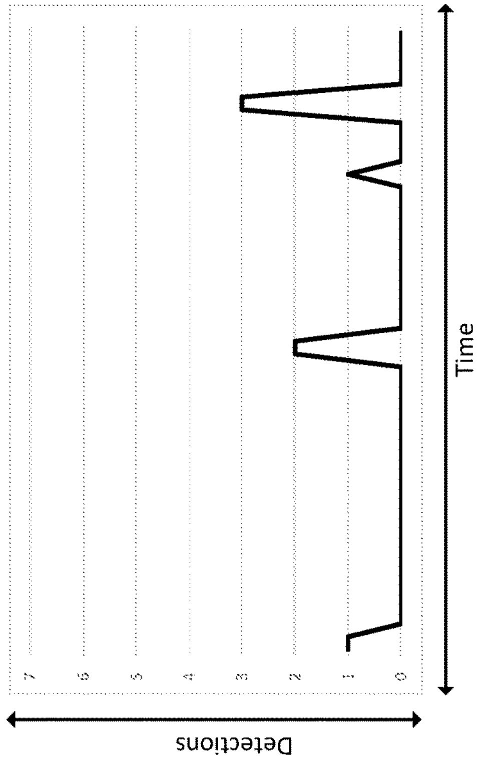
FIG. 4C illustrates another graph of AED model usage over time for a given device.

FIG. 4C illustrates usage of the third AED model, and the graph illustrates that detection of an acoustic event associated with the third AED model occurs infrequently but occurs when the acoustic event associated with the second AED model is detected. A scheduling component may be configured to utilize this data to determine that when certain events occur, such as when the second AED model detects acoustic events, the third AED is to be activated. An example of this may be that the second AED model detects user presence and the third AED model is trained to detect coughing. In this example, when presence is detected by the second AED model, the third AED model may be activated for a certain period of time and utilized during that period of time to detect coughing acoustic events.

Figure 4D:
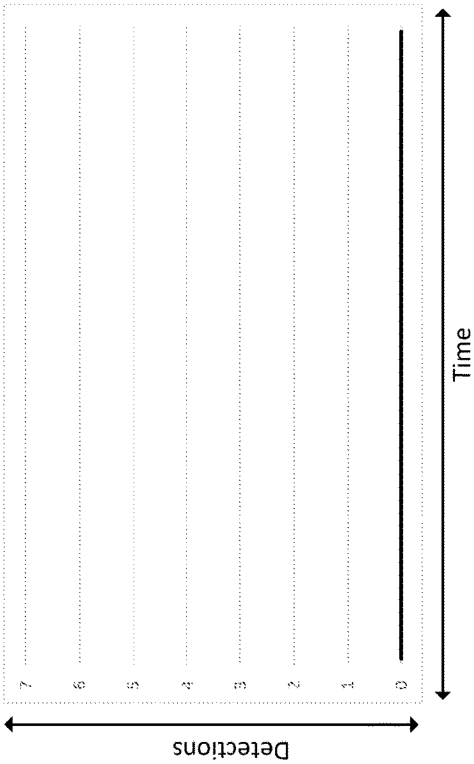
FIG. 4D illustrates another graph of AED model usage over time for a given device.

FIG. 4D illustrates usage of the fourth AED model, and the graph illustrates that detection of an acoustic event associated with the fourth AED model did not occur. In this example, the usage data may indicate that attributes associated with the device are such that the acoustic event for the fourth AED model is not detected on the device. This may occur, for example, when the sound at issue is not typically produced in a room or otherwise an environment where the device is located. In this example, the AED model selector may determine that the fourth AED model should be removed from the device to save on data storage and computational resources. However, in some examples, even though detection of the acoustic event associated with this AED model did not occur, the system may determine to refrain from deleting the model from the device at issue based at least in part on the acoustic event type associated with the model. For example, certain acoustic events are meant to be detected infrequently, such as detection of falls, detection of shattering glass, detection of other security-related events, etc. In these examples, if the acoustic event type is of a predefined acoustic event type indicated as occurring infrequently, the system may determine to refrain from causing the device in question to delete the AED model.

Figure 5:
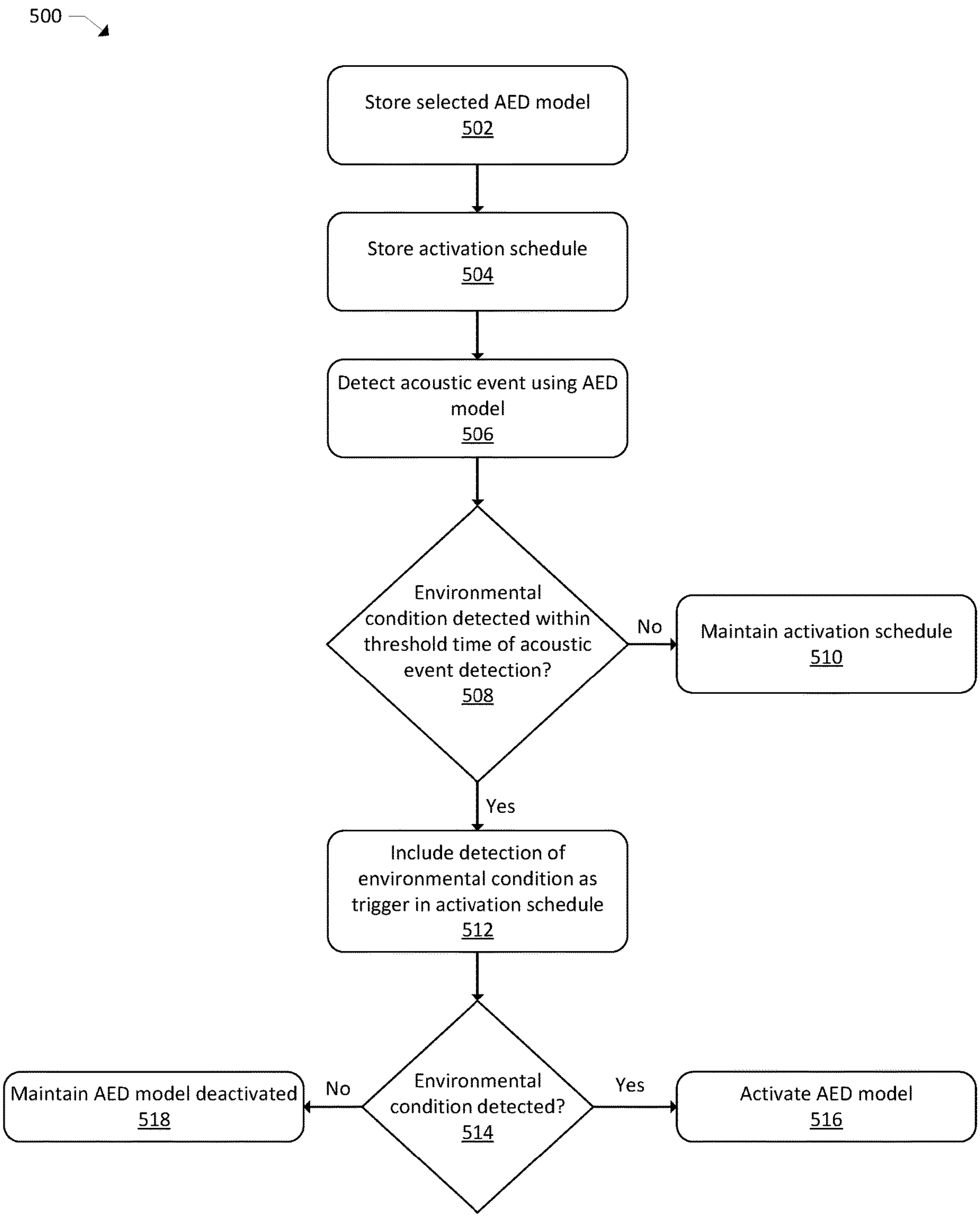
FIG. 5 illustrates a flow diagram of an example process for determining activation schedules associated with use of AED models.

FIG. 5 illustrates processes for AED customization. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-4 and 6-15, although the processes may be implemented in a wide variety of other environments, architectures and systems.

FIG. 5 illustrates a flow diagram of an example process 500 for determining activation schedules associated with use of AED models. The order in which the operations or steps are described is not intended to be construed as a limitation, and any number of the described operations may be combined in any order and/or in parallel to implement process 500.

At block 502, the process 500 may include storing a selected AED model. For example, an AED model selector may be configured to determine which AED models should be packaged and sent to given devices across multiple environments and/or multiple user accounts. To do so, the AED model selector may initially determine whether given user account data indicates that certain device functionalities associated with AED have been enrolled in. For example, a user may or may not have enrolled in presence detection functionality, security-related functionality, in-home-care functionality, environmental-condition-notification functionality, etc. These functionalities may each utilize AED at least in part to detect acoustic events in the environment at issue and to perform an action when such acoustic events are detected. For example, the presence detection functionality may be associated with running a routine to control smart home devices when user presence is or is not detected. The security-related functionality may include detection of glass breaking, which may indicate a security-related event for which a notification should be sent to a user device and/or emergency services. In these and other examples, the user may or may not have enrolled or otherwise indicated a desire to utilize these functionalities. The AED model selector may determine which functionalities the user account data at issue indicates have been enrolled in and may select an initial set of AED models to send to one or more devices associated with the user account data based at least in part on the functionality enrollment data. By so doing, the AED model selector may parse the AED models stored in the AED model storage such that only a subset of the AED models are selected to be sent to the one or more devices.

In some examples, the system may be configured to send the subset of AED models to all AED-enabled devices associated with the user account data at issue. In other examples, prior AED usage data may be utilized to determine which of the devices have previously detected acoustic events utilizing one or more AED models, and the subset of AED models may be sent to just those devices. Once the subset of the AED models is sent to and stored on the devices, AED model usage may be tracked over time. Take, for example, a scenario where a given environment includes two AED-enabled devices and each of the devices was sent the subset of AED models, which include four AED models each trained to detect a given acoustic event. The two devices may capture audio from the environment over time and the AED models may be utilized to detect when the corresponding audio data includes certain acoustic events over a period of time, such as over the course of four weeks. AED model usage data may be generated that indicates a number of acoustic events were detected using some or all of the AED models as well as when during the day such acoustic events were detected. In some examples, the AED model usage data may indicate that a first acoustic event was detected by a first device utilizing a first AED model multiple times over the four-week period. However, the AED model usage data may also indicate that at least one of the other AED models stored on the first device was not utilized to detect acoustic events. This AED model usage data may indicate that the device at issue associated with user behavior and/or environmental conditions that are associated with the first acoustic event of the first AED model but not acoustic events associated with one or more other AED models stored on the device. In these examples, the AED model selector may utilize the AED model usage data to determine that the unused or infrequently used AED model(s) should be removed from the device at issue. A concrete example of this scenario may be that one device is situated in a bedroom of an environment and thus detects snoring frequently, while another device is situated in a bathroom of the environment and thus does not detect snoring or irregularly detects snoring. A model management component may then be utilized to send a command to the device at issue, which may cause the device to remove the AED model(s) from data storage of the device.

Additionally, determining which devices will include which of the subset of AED models may be based at least in part on contextual data associated with the devices. For example, the AED model selector may determine that the AED model usage data indicates two devices detect the same acoustic event at or near the same time frequently. This data may indicate that the two devices are located in the same room and thus are likely to detect the same acoustic events. In this example, one of the devices may be selected to maintain certain AED models while the other device may be selected to have the certain AED models removed, freeing up data storage and computational resources for that device. Data associated with the detected acoustic events, including confidence values associated with detection of the acoustic event(s), may be utilized to determine which device should maintain the AED model at issue. Additionally, attributes of the devices at issue may also be utilized to determine which device should maintain the AED model and which device should have the AED model removed. For example, each device may be queried for data indicating an amount of data storage being used by each device. This storage data may be utilized by the AED model selector to select the device with the most available storage to maintain the AED model. Additionally, device configuration data may be utilized to select which device should include the AED model. This configuration data may include indicators of hardware, firmware, software, and/or other components that may impact the device's ability to process audio data for AED. Furthermore, user account data indicating groupings or otherwise associations between devices may be utilized to determine which devices should maintain which AED models. For example, if two devices are associated with the same device group and/or if both devices include a portion of the same naming indicator (e.g., one device is named "kitchen light" and another is named "kitchen assistant") this may indicate that the devices are near each other and that both devices likely need not store the same AED model. In these and other examples, the AED model selector may receive data over time indicating conditions of the environment at issue, the devices at issue, the user account at issue, etc. and may utilize such data to dynamically determine which AED models should be stored on which devices. The model management component may be utilized to send commands to the various devices over time to cause those devices to maintain and/or remove certain AED models from data storage of the devices.

At block 504, the process 500 may include storing an activation schedule for the AED model. For example, a scheduling component may be configured to determine an activation schedule for the AED models. For example, the AED model usage data described herein may be utilized to determine a time or day and/or day of the week when a given AED model typically is used to detect an acoustic event. An example of this may be that an AED model trained to detect snoring detects snoring on a given device in a given environment most days of the week between 10:00 pm and 6:00 am. Given this AED model usage data, the scheduling component may be configured to generate data representing an activation schedule indicating that the AED model should be queried for detection of snoring only between 10:00 pm and 6:00 am. By so doing, the AED model is not queried each time AED is performed by the device, saving on computational resources used by the device during times when the activation schedule indicates the AED model should not be queried.

At block 506, the process 500 may include detecting an acoustic event using the AED model during a period of time when the activation schedule indicates the AED model is active. For example, sample audio data may be utilized by the device in question and a CRNN may query the selected AED model for an indication of whether the AED model detects the acoustic event that the selected AED model is trained to detect.

At block 508, the process 500 may include determining whether an environmental condition is detected within a threshold amount of time prior to detection of the acoustic event. For example, the scheduling component may be configured to determine when environmental conditions are associated with acoustic events and may utilize those environmental conditions as triggers for activation of AED models. For example, when an acoustic event is detected utilizing a given AED model, other data collected by the device at issue and/or other devices in the environment may be utilized to determine a correlation between the acoustic event and an environmental condition. An example of this may be that a certain smart home light is turned off typically 30 minutes to 1 hour before snoring is detected on a device. Given this correlation, the scheduling component may determine that the environmental condition of the light being turned off is a trigger for activating the snoring AED model on the device at issue. Other environmental conditions may be receipt of speech input on a voice interface device, control of other smart home devices, detection of other acoustic events, and/or any other environmental condition. In some examples, the condition may be that a wearable or otherwise mobile device enters the environment and that device includes AED models. In this example, the condition of the device entering the environment may cause one or more of the AED models as stored on one or more of the devices in the environment to activate or deactivate.

In examples where an environmental condition is not detected, the process 500 may include, at block 510, maintaining the activation schedule without changes based on environmental conditions. In these examples, a new trigger for activating the selected AED model has not been determined, and as such the activation schedule may be maintained without change based on such environmental condition triggers.

In examples where an environmental condition is detected within the threshold amount of time prior to detection of the acoustic event, the process 500 may include, at block 512, including detection of the environmental condition as a trigger in the activation schedule. In these examples, data indicating an activation schedule with the environmental condition as a trigger may be generated and may replace the prior activation schedule that did not include the environmental condition trigger.

At block 514, the process 500 may include determining whether the environmental condition is detected. For example, one or more sensors of the device at issue and/or other devices in the environment may be utilized to determine if the environmental condition is detected.

In examples where the environmental condition is detected, the process 500 may include, at block 516, activating the AED model based at least in part on detection of the environmental condition. Activating the AED model may include causing the CRNN to query the AED model for results data indicating whether an acoustic event has been detected. In other examples, activation of the AED model may include causing the device or another device to process results from the AED model.

In examples where the environmental condition is not detected, the process 500 may include, at block 518, maintaining the AED model as deactivated until the environmental condition and/or one or more other triggers from the activation schedule are detected. In this example, a trigger has not occurred for activation of the AED model and thus the AED model may be maintained on the device at issue, but may not be queried to provide an indication of whether sample audio data includes an acoustic event.

As described with respect to FIG. 5, the system may utilize modeling, including machine learning models in examples, to learn user behaviors associated with AED and may update activation schedules and/or activation triggers based on those learned behaviors. Additionally, at any time that an activation schedule is described herein, it should be understood that any activation trigger may be utilized to activate and/or deactivate an AED model on any given device. As such, activation of AED models may not necessarily be scheduled to occur at given times, but instead may occur based at least in part on a given trigger event occurring as described herein.

Figure 6:
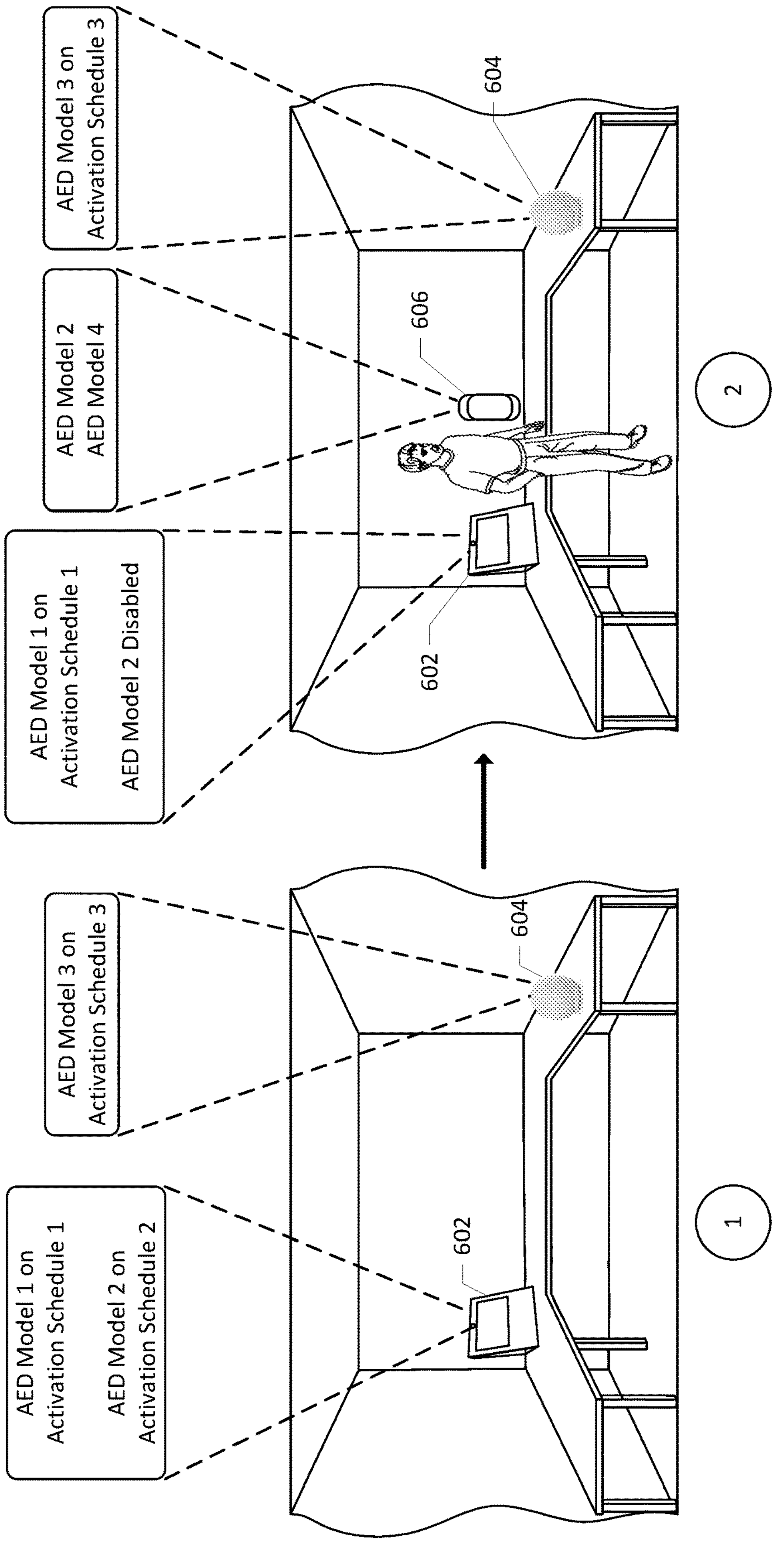
FIG. 6 illustrates a schematic diagram of an example environment for dynamic association of AED models with devices.

FIG. 6 illustrates a schematic diagram of an example environment for dynamic association of AED models with devices. FIG. 6 includes devices 602, 604, and 606. These device may be the same or similar to the devices 102 described with respect to FIG. 1. Additionally, FIG. 6 is shown in two steps where an environment at step 1 includes devices 602 and 604, and then at step 2 the environment includes device 602, device 604, and device 606. FIG. 6 illustrates how activation schedules of AED models on the various devices may change and devices move in and out of an environment.

For example, at step 1, the device 602 may have stored thereon AED Model 1 and AED Model 2. AED Model 1 may be associated with Activation Schedule 1, whereas AED Model 2 may be associated with Activation Schedule 2. Additionally, the device 604 may have stored thereon AED Model 3, which may be associated with Activation Schedule 3. It should be understood that while the various models described with respect to FIG. 6 are associated with separate activation schedules, any AED model may be associated with the same or different activation schedules as other AED models. In this example, an AED model selector may have selected AED Model 1 and AED Model 2 to be utilized by the device 602 and may have selected AED Model 3 to be utilized by the device 604. This selection may be based at least in part on enrollment data, AED model usage data, device configuration data, device data storage characteristics, and/or any other data described herein. In the example of FIG. 6, given that both the device 602 and the device 604 are located in the same room, the same AED model is not stored on both devices.

At step 2, a user with the device 606 enters the room in question. In this example, the device 606 may be detected by one or more other devices in the room and/or the system may otherwise detect a condition associated with the device 606 being in the room. Based at least in part on detecting the device 606, the activation schedule(s) associated with one or more of the devices may be changed and/or triggers associated with the activation schedule(s) may be determined to occur. Using FIG. 6 as an example, the device 606 may have stored thereon AED Model 2 and AED Model 4. In this example, the system may determine that now both the device 602 and the device 606 have AED Model 2 stored thereon and may determine that the activation schedule for both indicates that AED Model 2 is activate for both devices. In this example, the system may determine to deactivate AED Model 2 on one of the devices, here illustrated as being deactivated on the device 602. By so doing, Activation Schedule 2 may indicate that AED Model 2 is to be deactivated if another device within proximity of the device 602 is detected with AED Model 2 also active. Also, since AED Model 4 is only stored on the device 606, activation of AED Model 4 is not disturbed by inclusion of the device 606 in the environment. The same is true by way of example with respect to AED Model 1 on the device 602 and AED Model 3 on the device 604.

In addition to the above, selection of which device to store a given AED model on may be based at least in part on data reliability data associated with multiple devices. For example, when the system determines that one of multiple AED-enabled devices is to store and utilize a given AED model, data reliability data from prior data sending and receipt may be utilized to determine which device is better suited to perform AED. Such prior data sending and receipt may be associated with detection of past acoustic events and/or may be associated with data that is not related to AED.

Figure 7:
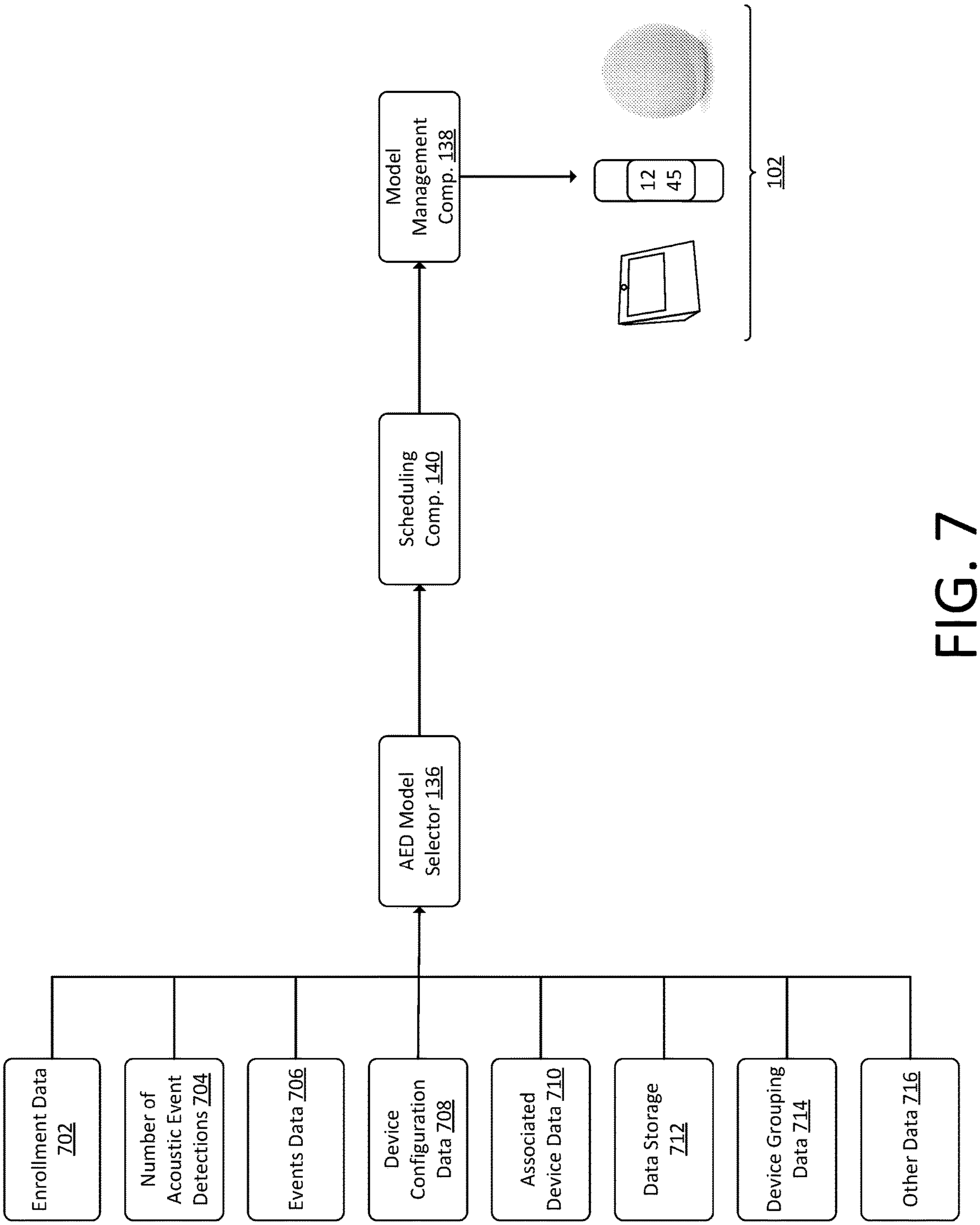
FIG. 7 illustrates a conceptual diagram of data types utilized for selecting AED models to associate with a device.

FIG. 7 illustrates a conceptual diagram of data types utilized for selecting AED models to associate with a device. FIG. 7 may include some of the same components as described with respect to FIG. 1. For example, FIG. 7 may include devices 102, an AED model selector 136, a model management component 138, and/or a scheduling component 140. Additionally, FIG. 7 may include one or more data types that may be utilized by the AED model selector 136. Those data types may include, for example, enrollment data 702, number of detected acoustic events 704, events data 706, device configuration data 708, associated device data 710, data storage 712, device grouping data 714, and/or other data 716. This data may be utilized by the AED model selector 136 to select which AED models in a corpus of models is to be sent and/or maintained on a device 102.

For example, with respect to the enrollment data 702, a user may or may not have enrolled in presence detection functionality, security-related functionality, in-home-care functionality, environmental-condition-notification functionality, etc. These functionalities may each utilize AED at least in part to detect acoustic events in the environment at issue and to perform an action when such acoustic events are detected. For example, the presence detection functionality may be associated with running a routine to control smart home devices when user presence is or is not detected. The security-related functionality may include detection of glass breaking, which may indicate a security-related event for which a notification should be sent to a user device and/or emergency services. In these and other examples, the user may or may not have enrolled or otherwise indicated a desire to utilize these functionalities, and the enrollment data 702 may indicate these enrollments. With respect to the number of detected acoustic events 704, AED model usage data may be generated that indicates a number of acoustic events were detected using some or all of the AED models as well as when during the day such acoustic events were detected. In some examples, the AED model usage data may indicate that a first acoustic event was detected by a first device utilizing a first AED model multiple times over the four-week period. However, the AED model usage data may also indicate that at least one of the other AED models stored on the first device was not utilized to detect acoustic events. This AED model usage data may indicate that the device at issue associated with user behavior and/or environmental conditions that are associated with the first acoustic event of the first AED model but not acoustic events associated with one or more other AED models stored on the device.

With respect to the events data 706, environmental conditions may be associated with acoustic events and may be utilized as triggers for activation of AED models. For example, when an acoustic event is detected utilizing a given AED model, other data collected by the device at issue and/or other devices in the environment may be utilized to determine a correlation between the acoustic event and an environmental condition. An example of this may be that a certain smart home light is turned off typically 30 minutes to 1 hour before snoring is detected on a device. Given this correlation, the system may determine that the environmental condition of the light being turned off is a trigger for activating the snoring AED model on the device at issue. Other environmental conditions may be receipt of speech input on a voice interface device, control of other smart home devices, detection of other acoustic events, and/or any other environmental condition. In some examples, the condition may be that a wearable or otherwise mobile device enters the environment and that device includes AED models. In this example, the condition of the device entering the environment may cause one or more of the AED models as stored on one or more of the devices in the environment to activate or deactivate.

With respect to the device configuration data 708, it may include indicators of hardware, firmware, software, and/or other components that may impact the device's ability to process audio data for AED. This device configuration data 708 may indicate an ability of a given device to detect acoustic events, store AED models, etc. With respect to associated device data 710, it may indicate which devices are located in the same environment as the device in question and what the capabilities are of the other devices. This information may be utilized to ensure the same AED model is not stored on multiple similarly-situated devices in the same environment, to determine which device should store which AED model, etc.

With respect to data storage 712, such data may be utilized by the AED model selector 136 to select the device with the most available storage to maintain the AED model. For example, multiple devices may be situated in the same environment and when selecting which of the devices should store a given AED model, data storage constraints and availability on each device may be utilized as a factor in selecting which of the devices is to store a given AED model. With respect to device grouping data 714, it may indicate groupings or otherwise associations between devices that may be utilized to determine which devices should maintain which AED models. For example, if two devices are associated with the same device group and/or if both devices include a portion of the same naming indicator (e.g., one device is named "kitchen light" and another is named "kitchen assistant") this may indicate that the devices are near each other and that both devices likely need not store the same AED model.

With respect to the other data 716, it should be understood that any data that may indicate a trigger event may be utilized to determine when an AED model should be activated and/or deactivated. In addition to the examples above, other examples of AED model activation and/or deactivation may include states of other devices. For example, a device may be in an away state, a home state, etc. These device states may be associated with when an AED model should be activated or not. By way of example, an AED model trained to detect footsteps may be activated when the device is in an away state but not when the device is in a home state. By way of an additional example, the triggers for AED model activation may include data received from an external device. For example, an AED model trained to detect the sound of thunder may be activated when data is received indicating that thunderstorms are likely in an area where the device in question is present, an AED model trained to detect sound from a delivery truck may be activated when data is received indicating that an online order includes details indicating a delivery is to be made on the day in question, an AED model trained to detect a doorbell chime when data is received indicating motion was detected at a smart doorbell, an AED model trained to detect the sound of crying when a smart watch or other device detects a fall event, etc. Also, as described herein, detection of a given sound utilizing a first AED model may be a trigger for the activation or deactivation of another AED model. For example, an AED model trained to detect the sound of thunder may detect the sound of thunder, and that detection may cause an AED model trained to detect the sound of a dog barking to be activated. In another example, an AED model trained to detect the sound of a door opening may trigger the same or a different AED model trained to detect the second of a door closing to be activated, and when the door closing sound is not detected may cause an action to be performed, such as the sending of a reminder to close the door.

Utilizing some or all of the data described herein, the AED model selector 136 may determine which of a corpus of AED models are to be packaged and sent to the devices 102 and/or may determine which AED models should be removed from a device 102, as described in more detail with respect to FIG. 1. In addition to determining which models are to be maintained on various devices, the scheduling component 140 may be configured to determine an activation schedule for the AED models utilizing some or all of the data described with respect to FIG. 7. The model management component 138 may be utilized to send a command to the device 102 at issue, which may cause the device 102 to store AED models, to remove AED model(s) from data storage of the device 102, and/or to activate or deactivate AED models pursuant to activation schedules.

Figure 8:
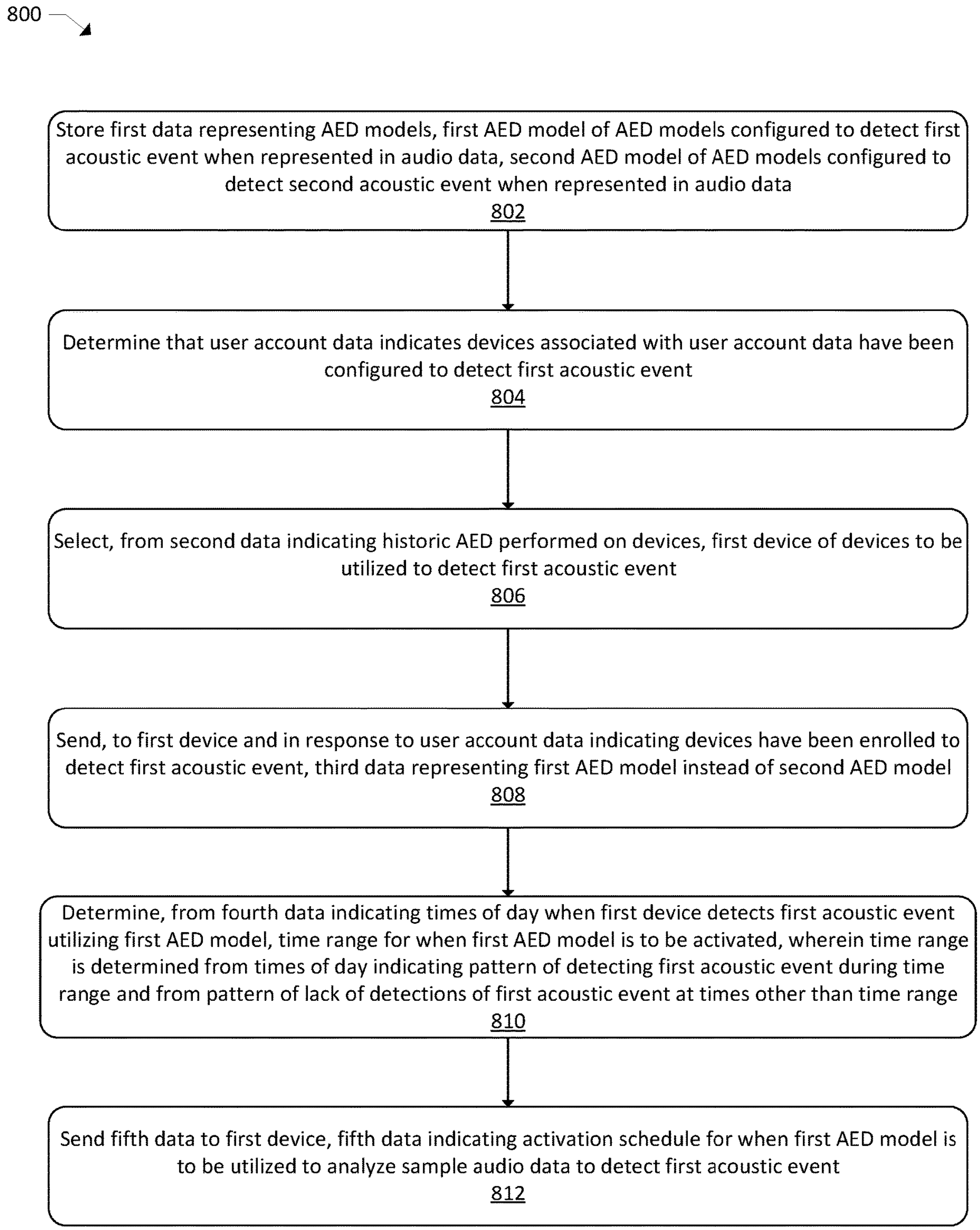
FIG. 8 illustrates a flow diagram of an example process for AED customization.
Figure 9:
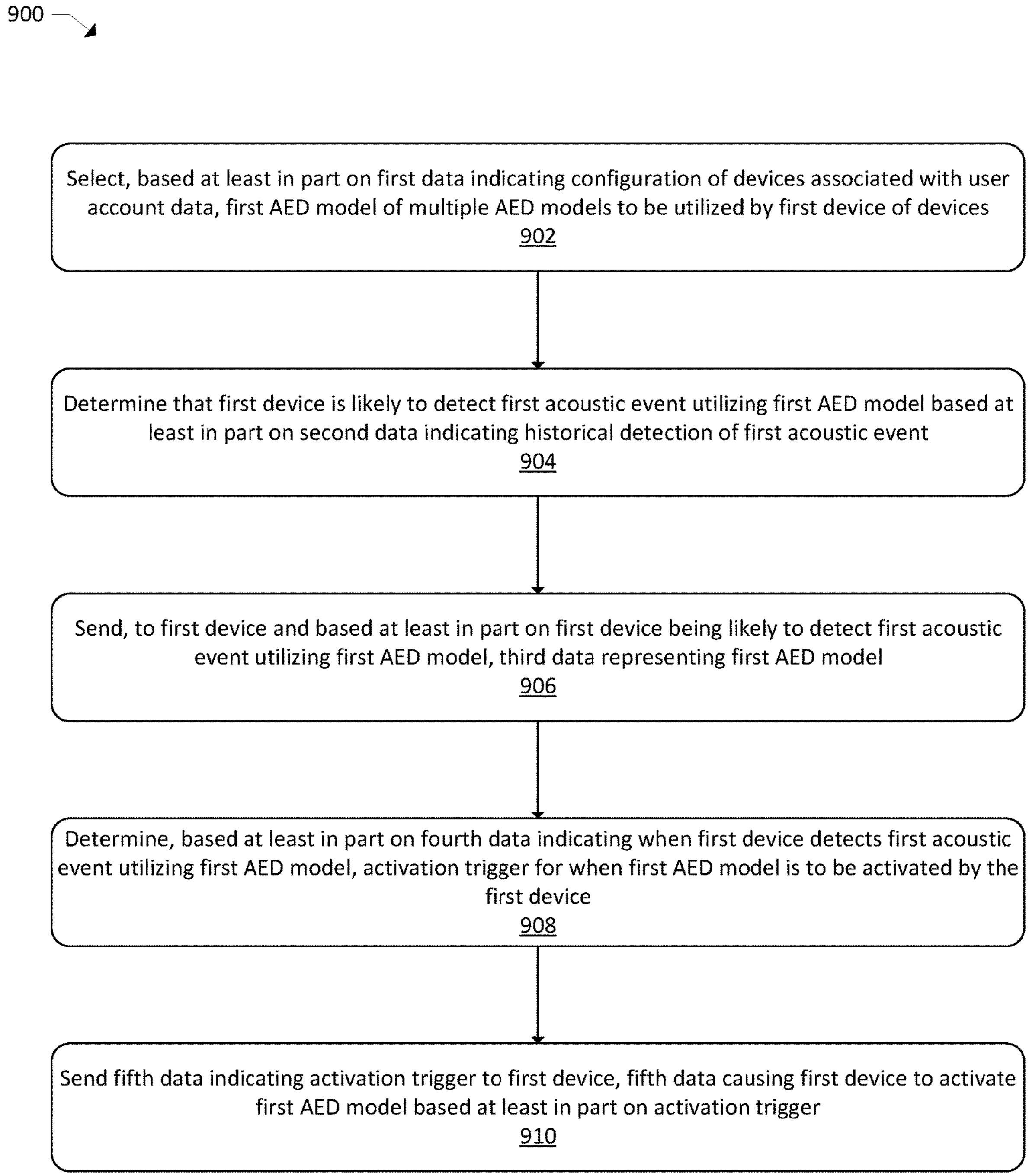
FIG. 9 illustrates a flow diagram of another example process for AED customization.

FIGS. 8 and 9 illustrate processes for AED customization. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-7 and 10-15, although the processes may be implemented in a wide variety of other environments, architectures and systems.

FIG. 8 illustrates a flow diagram of an example process 800 for AED customization. The order in which the operations or steps are described is not intended to be construed as a limitation, and any number of the described operations may be combined in any order and/or in parallel to implement process 800.

At block 802, the process 800 may include storing first data representing AED models, a first AED model of the AED models configured to detect a first acoustic event when represented in audio data, a second AED model of the AED models configured to detect a second acoustic event when represented in the audio data. For example, an AED model generator may be configured to generate one or more AED models. As described herein, each AED model may be generated and trained to detect a given sound or set of sounds. To do so, each AED model may be configured to intake audio data representing sample audio. The audio data may be analyzed using the AED model to determine whether characteristics of the audio data correspond at least to a threshold degree to characteristics of reference audio data utilized to train the AED model. The AED model may be configured to output results data indicating whether the AED model detected the acoustic event that AED model was trained to detect. The system may also include an AED model storage that may be configured to store some or all of the AED models that are generated and trained as described herein. It should be understood that the number of AED models may range from just a few models to thousands of models depending on the system at issue. For example, some AED models may be "prebuilt," or otherwise may be associated with acoustic events that may be universally used across various devices in various environments. Examples of such prebuilt AED models may be models trained to detect glass breaking, snoring, user presence, etc. Additionally, some AED models may be "customized" or otherwise may be generated based on a single user's request to do so. For example, a given user may desire to receive notifications when one of multiple dogs in an environment bark, or in other words the user may desire to differentiate between a given dog barking and the other dogs in the environment. To do so, the system described herein may be configured to receive reference audio data of the dog at issue barking, and the system may utilize that reference audio data to train a customized AED model for detecting that dog's bark. It should be understood that at least some customized AED models may become prebuilt models based at least in part on applicability of the customized AED model to other user accounts.

At block 804, the process 800 may include determining that user account data indicates devices associated with the user account data have been configured to detect the first acoustic event. For example, having generated and stored the AED models, an AED model selector may be configured to determine which AED models should be packaged and sent to given devices across multiple environments and/or multiple user accounts. To do so, the AED model selector may initially determine whether given user account data indicates that certain device functionalities associated with AED have been enrolled in. For example, a user may or may not have enrolled in presence detection functionality, security-related functionality, in-home-care functionality, environmental-condition-notification functionality, etc. These functionalities may each utilize AED at least in part to detect acoustic events in the environment at issue and to perform an action when such acoustic events are detected. For example, the presence detection functionality may be associated with running a routine to control smart home devices when user presence is or is not detected. The security-related functionality may include detection of glass breaking, which may indicate a security-related event for which a notification should be sent to a user device and/or emergency services. In these and other examples, the user may or may not have enrolled or otherwise indicated a desire to utilize these functionalities. The AED model selector may determine which functionalities the user account data at issue indicates have been enrolled in and may select an initial set of AED models to send to one or more devices associated with the user account data based at least in part on the functionality enrollment data. By so doing, the AED model selector may parse the AED models stored in the AED model storage such that only a subset of the AED models are selected to be sent to the one or more devices.

At block 806, the process 800 may include selecting, from second data indicating historic AED performed on the devices, a first device of the devices to be utilized to detect the first acoustic event. Take, for example, a scenario where a given environment includes two AED-enabled devices and each of the devices was sent the subset of AED models, which include four AED models each trained to detect a given acoustic event. The two devices may capture audio from the environment over time and the AED models may be utilized to detect when the corresponding audio data includes certain acoustic events over a period of time, such as over the course of four weeks. AED model usage data may be generated that indicates a number of acoustic events were detected using some or all of the AED models as well as when during the day such acoustic events were detected. In some examples, the AED model usage data may indicate that a first acoustic event was detected by a first device utilizing a first AED model multiple times over the four-week period. However, the AED model usage data may also indicate that at least one of the other AED models stored on the first device was not utilized to detect acoustic events. This AED model usage data may indicate that the device at issue associated with user behavior and/or environmental conditions that are associated with the first acoustic event of the first AED model but not acoustic events associated with one or more other AED models stored on the device. In these examples, the AED model selector may utilize the AED model usage data to determine that the unused or infrequently used AED model(s) should be removed from the device at issue. A concrete example of this scenario may be that one device is situated in a bedroom of an environment and thus detects snoring frequently, while another device is situated in a bathroom of the environment and thus does not detect snoring or irregularly detects snoring. A model management component may then be utilized to send a command to the device at issue, which may cause the device to remove the AED model(s) from data storage of the device.

Additionally, determining which devices will include which of the subset of AED models may be based at least in part on contextual data associated with the devices. For example, the AED model selector may determine that the AED model usage data indicates two devices detect the same acoustic event at or near the same time frequently. This data may indicate that the two devices are located in the same room and thus are likely to detect the same acoustic events. In this example, one of the devices may be selected to maintain certain AED models while the other device may be selected to have the certain AED models removed, freeing up data storage and computational resources for that device. Data associated with the detected acoustic events, including confidence values associated with detection of the acoustic event(s), may be utilized to determine which device should maintain the AED model at issue. Additionally, attributes of the devices at issue may also be utilized to determine which device should maintain the AED model and which device should have the AED model removed. For example, each device may be queried for data indicating an amount of data storage being used by each device. This storage data may be utilized by the AED model selector to select the device with the most available storage to maintain the AED model. Additionally, device configuration data may be utilized to select which device should include the AED model. This configuration data may include indicators of hardware, firmware, software, and/or other components that may impact the device's ability to process audio data for AED. Furthermore, user account data indicating groupings or otherwise associations between devices may be utilized to determine which devices should maintain which AED models. For example, if two devices are associated with the same device group and/or if both devices include a portion of the same naming indicator (e.g., one device is named "kitchen light" and another is named "kitchen assistant") this may indicate that the devices are near each other and that both devices likely need not store the same AED model. In these and other examples, the AED model selector may receive data over time indicating conditions of the environment at issue, the devices at issue, the user account at issue, etc. and may utilize such data to dynamically determine which AED models should be stored on which devices. The model management component may be utilized to send commands to the various devices over time to cause those devices to maintain and/or remove certain AED models from data storage of the devices.

At block 808, the process 800 may include sending, to the first device and in response to the user account data indicating the devices have been enrolled to detect the first acoustic event, third data representing the first AED model instead of the second AED model. For example, the first AED model may be packaged with other models, if any, and may be sent to the first device to be stored on the first device and to be utilized for detecting the first acoustic event.

At block 810, the process 800 may include determining, from fourth data indicating times of day when the first device detects the first acoustic event utilizing the first AED model, a time range for when the first AED model is to be activated, wherein the time range is determined from the times of day indicating a pattern of detecting the first acoustic event during the time range and from a pattern of lack of detections of the first acoustic event at times other than the time range. For example, a scheduling component may be configured to determine an activation schedule for the AED models. For example, the AED model usage data described herein may be utilized to determine a time or day and/or day of the week when a given AED model typically is used to detect an acoustic event. An example of this may be that an AED model trained to detect snoring detects snoring on a given device in a given environment most days of the week between 10:00 pm and 6:00 am. Given this AED model usage data, the scheduling component may be configured to generate data representing an activation schedule indicating that the AED model should be queried for detection of snoring only between 10:00 pm and 6:00 am. By so doing, the AED model is not queried each time AED is performed by the device, saving on computational resources used by the device during times when the activation schedule and/or activation trigger indicates the AED model should not be queried.

In addition to utilizing AED model usage data to determine the activation schedule described herein, the scheduling component may also be configured to determine when environmental conditions are associated with acoustic events and may utilize those environmental conditions as triggers for activation of AED models. For example, when an acoustic event is detected utilizing a given AED model, other data collected by the device at issue and/or other devices in the environment may be utilized to determine a correlation between the acoustic event and an environmental condition. An example of this may be that a certain smart home light is turned off typically 30 minutes to 1 hour before snoring is detected on a device. Given this correlation, the scheduling component may determine that the environmental condition of the light being turned off is a trigger for activating the snoring AED model on the device at issue. Other environmental conditions may be receipt of speech input on a voice interface device, control of other smart home devices, detection of other acoustic events, and/or any other environmental condition. In some examples, the condition may be that a wearable or otherwise mobile device enters the environment and that device includes AED models. In this example, the condition of the device entering the environment may cause one or more of the AED models as stored on one or more of the devices in the environment to activate or deactivate.

At block 812, the process 800 may include sending fifth data to the first device, the fifth data indicating an activation schedule for when the first AED model is to be queried to analyze sample audio data to detect the first acoustic event. For example, the fifth data may be in the form of the activation trigger, which may be stored on the first device and utilized to determine when the first AED model is to be activated and deactivated during a given period of time, such as a day.

Additionally, or alternatively, the process 800 may include sending the third data representing the first AED model to a second device of the devices and receiving, during a period of time, sixth data indicating a first number of times that the first AED model was utilized to detect the first acoustic event on the second device. The process 800 may also include determining that the first number of times fails to satisfy a threshold number of times. The process 800 may also include sending, to the second device, a command configured to cause the first AED model to be removed from the second device.

Additionally, or alternatively, the process 800 may include receiving sixth data indicating when the first acoustic event is detected using the first AED model on the first device. The process 800 may also include receiving seventh data indicating environmental conditions of an environment where the first device is situated during a period of time prior to when the first acoustic event is detected on the first device. In these examples, the time range may be determined from when the environmental conditions are detected.

Additionally, or alternatively, the process 800 may include sending the first AED model to a second device of the devices and receiving sixth data indicating that the first device detected the first acoustic event at a time when the second device detected the first acoustic event. The process 800 may also include sending a command to the first device, the command configured to cause the first AED model to be removed from the first device in response to the first device detecting the first acoustic event at the time when the second device detected the first acoustic event.

Additionally, or alternatively, the process 800 may include determining that the first device is associated with an environment where a second device of the devices is situated. The process 800 may also include determining that the user account data indicates the second AED model is to be utilized by at least one of the devices. The process 800 may also include determining a first amount of first data storage being utilized by the first device and determining a second amount of second data storage being utilized by the second device. The process 800 may also include determining that the first amount exceeds the second amount. The process 800 may also include selecting the second device to utilize the second AED model instead of the first device based at least in part on the first amount exceeding the second amount.

FIG. 9 illustrates a flow diagram of another example process 900 for AED customization. The order in which the operations or steps are described is not intended to be construed as a limitation, and any number of the described operations may be combined in any order and/or in parallel to implement process 900.

At block 902, the process 900 may include selecting, based at least in part on first data indicating configuration of devices associated with user account data, a first AED model of multiple AED models to be utilized by a first device of the devices. To do so, an AED model selector may initially determine whether given user account data indicates that certain device functionalities associated with AED have been enrolled in. For example, a user may or may not have enrolled in presence detection functionality, security-related functionality, in-home-care functionality, environmental-condition-notification n functionality, etc. These functionalities may each utilize AED at least in part to detect acoustic events in the environment at issue and to perform an action when such acoustic events are detected. For example, the presence detection functionality may be associated with running a routine to control smart home devices when user presence is or is not detected. The security-related functionality may include detection of glass breaking, which may indicate a security-related event for which a notification should be sent to a user device and/or emergency services. In these and other examples, the user may or may not have enrolled or otherwise indicated a desire to utilize these functionalities. The AED model selector may determine which functionalities the user account data at issue indicates have been enrolled in and may select an initial set of AED models to send to one or more devices associated with the user account data based at least in part on the functionality enrollment data. By so doing, the AED model selector may parse the AED models stored in the AED model storage such that only a subset of the AED models are selected to be sent to the one or more devices.

At block 904, the process 900 may include determining that the first device is likely to detect a first acoustic event utilizing the first AED model based at least in part on second data indicating historical detection of the first acoustic event. Take, for example, a scenario where a given environment includes two AED-enabled devices and each of the devices was sent the subset of AED models, which include four AED models each trained to detect a given acoustic event. The two devices may capture audio from the environment over time and the AED models may be utilized to detect when the corresponding audio data includes certain acoustic events over a period of time, such as over the course of four weeks. AED model usage data may be generated that indicates a number of acoustic events were detected using some or all of the AED models as well as when during the day such acoustic events were detected. In some examples, the AED model usage data may indicate that a first acoustic event was detected by a first device utilizing a first AED model multiple times over the four-week period. However, the AED model usage data may also indicate that at least one of the other AED models stored on the first device was not utilized to detect acoustic events. This AED model usage data may indicate that the device at issue associated with user behavior and/or environmental conditions that are associated with the first acoustic event of the first AED model but not acoustic events associated with one or more other AED models stored on the device. In these examples, the AED model selector may utilize the AED model usage data to determine that the unused or infrequently used AED model(s) should be removed from the device at issue. A concrete example of this scenario may be that one device is situated in a bedroom of an environment and thus detects snoring frequently, while another device is situated in a bathroom of the environment and thus does not detect snoring or irregularly detects snoring. A model management component may then be utilized to send a command to the device at issue, which may cause the device to remove the AED model(s) from data storage of the device.

Additionally, determining which devices will include which of the subset of AED models may be based at least in part on contextual data associated with the devices. For example, the AED model selector may determine that the AED model usage data indicates two devices detect the same acoustic event at or near the same time frequently. This data may indicate that the two devices are located in the same room and thus are likely to detect the same acoustic events. In this example, one of the devices may be selected to maintain certain AED models while the other device may be selected to have the certain AED models removed, freeing up data storage and computational resources for that device. Data associated with the detected acoustic events, including confidence values associated with detection of the acoustic event(s), may be utilized to determine which device should maintain the AED model at issue. Additionally, attributes of the devices at issue may also be utilized to determine which device should maintain the AED model and which device should have the AED model removed. For example, each device may be queried for data indicating an amount of data storage being used by each device. This storage data may be utilized by the AED model selector to select the device with the most available storage to maintain the AED model. Additionally, device configuration data may be utilized to select which device should include the AED model. This configuration data may include indicators of hardware, firmware, software, and/or other components that may impact the device's ability to process audio data for AED. Furthermore, user account data indicating groupings or otherwise associations between devices may be utilized to determine which devices should maintain which AED models. For example, if two devices are associated with the same device group and/or if both devices include a portion of the same naming indicator (e.g., one device is named "kitchen light" and another is named "kitchen assistant") this may indicate that the devices are near each other and that both devices likely need not store the same AED model. In these and other examples, the AED model selector may receive data over time indicating conditions of the environment at issue, the devices at issue, the user account at issue, etc. and may utilize such data to dynamically determine which AED models should be stored on which devices. The model management component may be utilized to send commands to the various devices over time to cause those devices to maintain and/or remove certain AED models from data storage of the devices.

At block 906, the process 900 may include sending, to the first device and based at least in part on first device being likely to detect the first acoustic event utilizing the first AED model, third data representing the first AED model. For example, the first AED model may be packaged with other models, if any, and may be sent to the first device to be stored on the first device and to be utilized for detecting the first acoustic event.

At block 908, the process 900 may include determining, based at least in part on fourth data indicating when the first device detects a first acoustic event utilizing the first AED model, an activation trigger for when the first AED model is to be activated by the first device. For example, a scheduling component may be configured to determine an activation schedule for the AED models. For example, the AED model usage data described herein may be utilized to determine a time or day and/or day of the week when a given AED model typically is used to detect an acoustic event. An example of this may be that an AED model trained to detect snoring detects snoring on a given device in a given environment most days of the week between 10:00 pm and 6:00 am. Given this AED model usage data, the scheduling component may be configured to generate data representing an activation schedule indicating that the AED model should be queried for detection of snoring only between 10:00 pm and 6:00 am. By so doing, the AED model is not queried each time AED is performed by the device, saving on computational resources used by the device during times when the activation schedule indicates the AED model should not be queried.

In addition to utilizing AED model usage data to determine the activation schedule described herein, the scheduling component may also be configured to determine when environmental conditions are associated with acoustic events and may utilize those environmental conditions as triggers for activation of AED models. For example, when an acoustic event is detected utilizing a given AED model, other data collected by the device at issue and/or other devices in the environment may be utilized to determine a correlation between the acoustic event and an environmental condition. An example of this may be that a certain smart home light is turned off typically 30 minutes to 1 hour before snoring is detected on a device. Given this correlation, the scheduling component may determine that the environmental condition of the light being turned off is a trigger for activating the snoring AED model on the device at issue. Other environmental conditions may be receipt of speech input on a voice interface device, control of other smart home devices, detection of other acoustic events, and/or any other environmental condition. In some examples, the condition may be that a wearable or otherwise mobile device enters the environment and that device includes AED models. In this example, the condition of the device entering the environment may cause one or more of the AED models as stored on one or more of the devices in the environment to activate or deactivate.

At block 910, the process 900 may include sending fifth data indicating the activation trigger to the first device, the fifth data causing the first device to activate the first AED model based at least in part on the activation trigger. For example, the fifth data may be in the form of the activation schedule, which may be stored on the first device and utilized to determine when the first AED model is to be activated and deactivated during a given period of time, such as a day.

Additionally, or alternatively, the process 900 may include sending the third data representing the first AED model to a second device of the devices. The process 900 may also include receiving sixth data indicating a first number of times that the first AED model was utilized to detect the first acoustic event on the second device and determining that the first number of times fails to satisfy a threshold number of times. The process 900 may also include sending, to the second device, a command configured to cause the first AED model to delete the first AED model.

Additionally, or alternatively, the process 900 may include receiving sixth data indicating when the first acoustic event is detected using the first AED model on the first device. The process 900 may also include receiving seventh data indicating an environmental condition identified in association with the first acoustic event being detected on the first device. In these examples, determining the activation trigger may be based at least in part on when the environmental condition is identified.

Additionally, or alternatively, the process 900 may include sending the first AED model to a second device of the devices. The process 900 may also include receiving sixth data indicating that the first device detected the first acoustic event at a time when the second device detected the first acoustic event. The process 900 may also include sending a command to the first device, the command configured to cause the first AED model to be deleted from the first device.

Additionally, or alternatively, the process 900 may include determining, based at least in part on the user account data, a configuration of the first device, the configuration indicating at least one of hardware or software components of the first device associated with performing AED. In these examples, selecting the first AED model to be utilized by the first device may be based at least in part on the configuration.

Additionally, or alternatively, the process 900 may include determining that the first device is associated with an environment where a second device of the devices is situated. The process 900 may also include determining that the user account data indicates the second AED model is to be utilized by at least one of the devices. The process 900 may also include determining a first amount of first data storage being utilized by the first device and determining a second amount of second data storage being utilized by the second device. The process 900 may also include determining that the first amount exceeds the second amount. The process 900 may also include selecting the second device to utilize the second AED model instead of the first device based at least in part on the first amount exceeding the second amount.

Additionally, or alternatively, the process 900 may include selecting the first device to receive the AED model based at least in part on a first interaction indicating user input data has been received requesting to enroll in usage of a portion of the AED models and/or a second interaction indicating historical use of the first device to detect the first acoustic event.

Additionally, or alternatively, the process 900 may include determining that a second device of the devices has detected a second acoustic event utilizing a second AED model of the AED models. The process 900 may also include determining that the second AED model is associated with the first AED model. The process 900 may also include sending the third data representing the first AED model to the second device based at least in part on the second AED model being associated with the first AED model.

Additionally, or alternatively, the process 900 may include receiving sixth data indicating that the first acoustic event has not been detected on the first device within a threshold amount of time. The process 900 may also include determining, based at least in part on the sixth data, that the first acoustic event is associated with a predefined acoustic event type. The process 900 may also include determining, based at least in part on the first acoustic event being associated with the predefined acoustic event type, to refrain from sending a command to the first device to cause the first AED model to be deleted from the first device.

Figure 10:
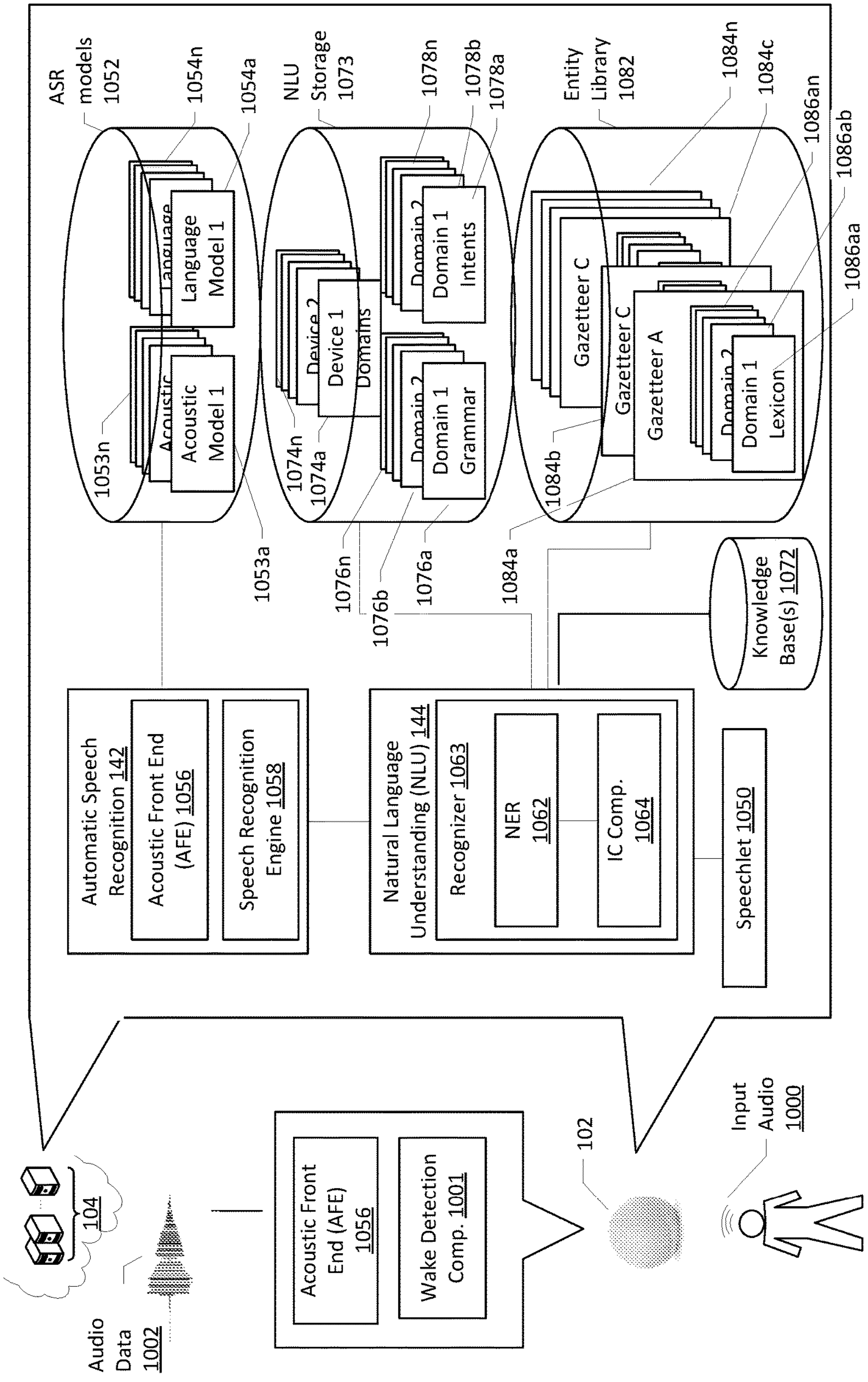
FIG. 10 illustrates a conceptual diagram of components of a speech-processing system for processing audio data provided by one or more devices.

FIG. 10 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin processing audio data). The various components illustrated may be located on a same device or different physical devices. Message between various components illustrated in FIG. 10 may occur directly or across a network 106. An audio capture component, such as a microphone 114 of the device 102, or another device, captures audio 1000 corresponding to a spoken utterance. The device 102, using a wake word engine 1001, then processes audio data corresponding to the audio 1000 to determine if a keyword (such as a wakeword) is detected in the audio data. Following detection of a wakeword, the device 102 processes audio data 1002 corresponding to the utterance utilizing an ASR component 142. The audio data 1002 may be output from an optional acoustic front end (AFE) 1056 located on the device prior to transmission. In other instances, the audio data 1002 may be in a different form for processing by a remote AFE 1056, such as the AFE 1056 located with the ASR component 142.

The wake word engine 1001 works in conjunction with other components of the user device, for example a microphone to detect keywords in audio 1000. For example, the device may convert audio 1000 into audio data, and process the audio data with the wake word engine 1001 to determine whether human sound is detected, and if so, if the audio data comprising human sound matches an audio fingerprint and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake-word component 1001 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio fingerprints, or other data to determine if the incoming audio "matches" stored audio data corresponding to a keyword.

Thus, the wake word engine 1001 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102(*a*) may “wake.” The audio data 1002 may include data corresponding to the wakeword. Further, a local device may “wake” upon detection of speech/spoken audio above a threshold, as described herein. An ASR component 142 may convert the audio data 1002 into text. The ASR transcribes audio data into text data representing the words of the speech contained in the audio data 1002. The text data may then be used by other components for various purposes, such as executing system commands, inputting data, etc. A spoken utterance in the audio data is input to a processor configured to perform ASR which then interprets the utterance based on the similarity between the utterance and pre-established language models 1054 stored in an ASR model knowledge base (ASR Models Storage 1052). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 1053 stored in an ASR Models Storage 1052), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 142 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 1056 and a speech recognition engine 1058. The acoustic front end (AFE) 1056 transforms the audio data from the microphone into data for processing by the speech recognition engine 1058. The speech recognition engine 1058 compares the speech recognition data with acoustic models 1053, language models 1054, and other data models and information for recognizing the speech conveyed in the audio data. The AFE 1056 may reduce noise in the audio data and divide the digitized audio data into frames representing time intervals for which the AFE 1056 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 1058 may process the output from the AFE 1056 with reference to information stored in speech/model storage (1052). Alternatively, post front-end processed data (such as feature vectors) may be received by the device executing ASR processing from another source besides the internal AFE. For example, the user device may process audio data into feature vectors (for example using an on-device AFE 1056).

The speech recognition engine 1058 attempts to match received feature vectors to language phonemes and words as known in the stored acoustic models 1053 and language models 1054. The speech recognition engine 1058 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be “Alexa, turn on Light A” The wake detection component may identify the wake word, otherwise described as a trigger expression, “Alexa,” in the user utterance and may “wake” based on identifying the wake word. The speech recognition engine 1058 may identify, determine, and/or generate text data corresponding to the user utterance, here “turn on Light A.”

The speech recognition engine 1058 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 1058 to other processing components, which may be local to the device performing ASR and/or distributed across the network(s). For example, ASR results in the form of a single textual representation of the speech, an N-best list including multiple hypotheses and respective scores, lattice, etc. may be utilized, for natural language understanding (NLU) processing, such as conversion of the text into commands for execution, by the user device and/or by another device (such as a server running a specific application like a search engine, etc.).

The device performing NLU processing 144 may include various components, including potentially dedicated processor(s), memory, storage, etc. As shown in FIG. 10, an NLU component 144 may include a recognizer 1063 that includes a named entity recognition (NER) component 1062 which is used to identify portions of query text that correspond to a named entity that may be recognizable by the system. A downstream process called named entity resolution links a text portion to a specific entity known to the system. To perform named entity resolution, the system may utilize gazetteer information (1084*a*-1084*n*) stored in entity library storage 1082. The gazetteer information may be used for entity resolution, for example matching ASR results with different entities (such as voice-enabled devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 140 based on the utterance input audio 1000) and attempts to make a semantic interpretation of the text. That is, the NLU process determines the meaning behind the text based on the individual words and then implements that meaning. NLU processing 144 interprets a text string to derive an intent or a desired action from the user as well as the pertinent pieces of information in the text that allow a device (e.g., device 102(*a*)) to complete that action. For example, if a spoken utterance is processed using ASR 142 and outputs the text "turn on Light A" the NLU process may determine that the user intended to cause a device state of a device named Light A.

The NLU 144 may process several textual inputs related to the same utterance. For example, if the ASR 142 outputs N text segments (as part of an N-best list), the NLU may process all N outputs to obtain NLU results.

As will be discussed further below, the NLU process may be configured to parse and tag to annotate text as part of NLU processing. For example, for the text "turn on Light A," "turn on" may be tagged as a command (to perform device state transition).

To correctly perform NLU processing of speech input, an NLU process 144 may be configured to determine a "domain" of the utterance so as to determine and narrow down which services offered by the endpoint device may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 1062 receives a query in the form of ASR results and attempts to identify relevant grammars and lexical information that may be used to construe meaning. To do so, the NLU component 144 may begin by identifying potential domains that may relate to the received query. The NLU storage 1073 includes a database of devices (1074*a*-1074*n*) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," health care," "smart home," "communications," "shopping," "music," "calendaring," etc. As such, each domain may be associated with a particular recognizer 1063, language model and/or grammar database (1076*a*-1076*n*), a particular set of intents/actions (1078*a*-1078*n*), and a particular personalized lexicon (1086). Each gazetteer (1084*a*-1084*n*) may include domain-indexed lexical information associated with a particular user and/or device. For example, the Gazetteer A (1084*a*) includes domain-index lexical information 1086*aa* to 1086*an*. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 1064 parses the query to determine an intent or intents for each identified domain, where the intent corresponds to the action to be performed that is responsive to the query. Each domain is associated with a database (1078*a*-1078*n*) of words linked to intents. For example, a communications intent database may link words and phrases such as "identify song," "song title," "determine song," to a "song title" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 1064 identifies potential intents for each identified domain by comparing words in the query to the words and phrases in the intents database 1078. In some instances, the determination of an intent by the IC component 1064 is performed using a set of rules or templates that are processed against the incoming text to identify a matching intent.

In order to generate a particular interpreted response, the NER 1062 applies the grammar models and lexical information associated with the respective domain to actually recognize a mention of one or more entities in the text of the query. In this manner, the NER 1062 identifies "slots" or values (i.e., particular words in query text) that may be needed for later command processing. Depending on the complexity of the NER 1062, it may also label each slot with a type of varying levels of specificity (such as noun, place, device name, device location, city, artist name, song name, amount of time, timer number, or the like). Each grammar model 1076 includes the names of entities (i.e., nouns) commonly found in speech about the particular domain (i.e., generic terms), whereas the lexical information 1086 from the gazetteer 1084 is personalized to the user(s) and/or the device. For instance, a grammar model associated with the shopping domain may include a database of words commonly used when people discuss shopping.

The intents identified by the IC component 1064 are linked to domain-specific grammar frameworks (included in 1076) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "purchase" is an identified intent, a grammar (1076) framework or frameworks may correspond to sentence structures such as "purchase item called 'Item A' from Marketplace A."

For example, the NER component 1062 may parse the query to identify words as subject, object, verb, preposition, etc., based on grammar rules and/or models, prior to recognizing named entities. The identified verb may be used by the IC component 1064 to identify intent, which is then used by the NER component 1062 to identify frameworks. A framework for the intent of "play a song," meanwhile, may specify a list of slots/fields applicable to play the identified "song" and any object modifier (e.g., specifying a music collection from which the song should be accessed) or the like. The NER component 1062 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 1062 may search the database of generic words associated with the domain (in the knowledge base 1072). So, for instance, if the query was "identify this song," after failing to determine which song is currently being output, the NER component 1062 may search the domain vocabulary for songs that have been requested lately. In the alternative, generic words may be checked before the gazetteer information, or both may be tried, potentially producing two different results.

The output data from the NLU processing (which may include tagged text, commands, etc.) may then be sent to a speechlet 1050. The destination speechlet 1050 may be determined based on the NLU output. For example, if the NLU output includes a command to send a message, the destination speechlet 1050 may be a message sending application, such as one located on the user device or in a message sending appliance, configured to execute a message sending command. If the NLU output includes a search request, the destination application may include a search engine processor, such as one located on a search server, configured to execute a search command. After the appropriate command is generated based on the intent of the user, the speechlet 1050 may provide some or all of this information to a text-to-speech (TTS) engine. The TTS engine may then generate an actual audio file for outputting the audio data determined by the application (e.g., "okay," or "Light A on").

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 144 during runtime operations where NLU operations are performed on text (such as text output from an ASR component 142). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 1063. Each recognizer may include various NLU components such as an NER component 1062, IC component 1064 and other components such as an entity resolver, or other components.

For example, a messaging domain recognizer 1063-A (Domain A) may have an NER component 1062-A that identifies what slots (i.e., portions of input text) may correspond to particular words relevant to that domain. The words may correspond to entities such as (for the messaging domain) a recipient. An NER component 1062 may use a machine learning model, such as a domain specific conditional random field (CRF) to both identify the portions corresponding to an entity as well as identify what type of entity corresponds to the text portion. The messaging domain recognizer 1063-A may also have its own intent classification (IC) component 1064-A that determines the intent of the text assuming that the text is within the proscribed domain. An IC component may use a model, such as a domain specific maximum entropy classifier to identify the intent of the text, where the intent is the action the user desires the system to perform. For this purpose, device 102 may include a model training component. The model training component may be used to train the classifier(s)/machine learning models discussed above.

As noted above, multiple devices may be employed in a single speech-processing system. In such a multi-device system, each of the devices may include different components for performing different aspects of the speech processing. The multiple devices may include overlapping components. The components of the user device and the system 104, as illustrated herein are exemplary, and may be located in a stand-alone device or may be included, in whole or in part, as a component of a larger device or system, may be distributed across a network or multiple devices connected by a network, etc.

Figure 11:
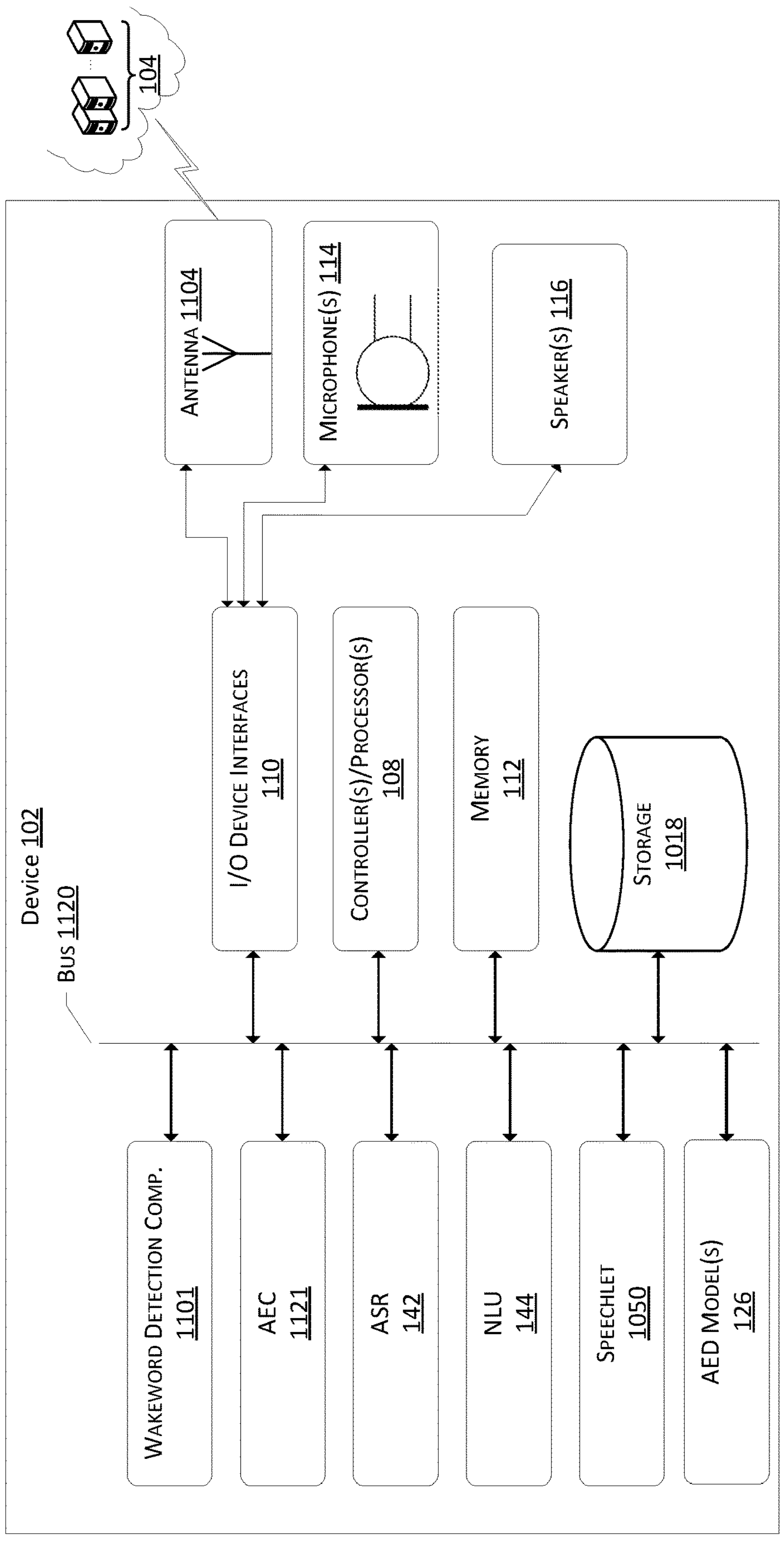
FIG. 11 illustrates a conceptual diagram of components of an example device that may utilized in association with AED customization.

FIG. 11 illustrates a conceptual diagram of components of an example connected device from which sensor data may be received for device functionality control utilizing activity prediction. For example, the device may include one or more electronic devices such as voice interface devices (e.g., smart speaker devices, mobile phones, tablets, personal computers, etc.), video interface devices (e.g., televisions, set top boxes, virtual/augmented reality headsets, etc.), touch interface devices (tablets, phones, laptops, kiosks, billboard, etc.), and accessory devices (e.g., lights, plugs, locks, thermostats, appliances, televisions, clocks, smoke detectors, doorbells, cameras, motion/magnetic/other security-system sensors, etc.). These electronic devices may be situated in a home associated with the first user profile, in a place a business, healthcare facility (e.g., hospital, doctor's office, pharmacy, etc.), in vehicle (e.g., airplane, truck, car, bus, etc.) in a public forum (e.g., shopping center, store, etc.), for example. A second user profile may also be associated with one or more other electronic devices, which may be situated in home or other place associated with the second user profile, for example. The device 102 may be implemented as a standalone device that is relatively simple in terms of functional capabilities with limited input/output components, memory, and processing capabilities. For instance, the device 102 may not have a keyboard, keypad, touchscreen, or other form of mechanical input. In some instances, the device 102 may include a microphone 114, a power source, and functionality for sending generated audio data via one or more antennas 1104 to another device and/or system.

The device 102 may also be implemented as a more sophisticated computing device, such as a computing device similar to, or the same as, a smart phone or personal digital assistant. The device 102 may include a display with a touch interface and various buttons for providing input as well as additional functionality such as the ability to send and receive communications. Alternative implementations of the device 102 may also include configurations as a personal computer. The personal computer may include input devices such as a keyboard, a mouse, a touchscreen, and other hardware or functionality that is found on a desktop, notebook, netbook, or other personal computing devices. In examples, the device 102 may include an automobile, such as a car. In other examples, the device 102 may include a pin on a user's clothes or a phone on a user's person. In examples, the device 102 and may not include speaker(s) and may utilize speaker(s) of an external or peripheral device to output audio via the speaker(s) of the external/peripheral device. In this example, the device 102 might represent a set-top box (STB), and the device 102 may utilize speaker(s) of another device such as a television that is connected to the STB for output of audio via the external speakers. In other examples, the device 102 may not include the microphone(s) 114, and instead, the device 102 can utilize microphone(s) of an external or peripheral device to capture audio and/or generate audio data. In this example, the device 102 may utilize microphone(s) of a headset that is coupled (wired or wirelessly) to the device 102. These types of devices are provided by way of example and are not intended to be limiting, as the techniques described in this disclosure may be used in essentially any device that has an ability to recognize speech input or other types of natural language input.

The device 102 of FIG. 11 may include one or more controllers/processors 108, that may include a central processing unit (CPU) for processing data and computer-readable instructions, and memory 112 for storing data and instructions of the device 102. In examples, the skills and/or applications described herein may be stored in association with the memory 112, which may be queried for content and/or responses as described herein. The device 102 may also be connected to removable or external non-volatile memory and/or storage, such as a removable memory card, memory key drive, networked storage, etc., through input/output device interfaces 110.

Computer instructions for operating the device 102(*a*) and its various components may be executed by the device's controller(s)/processor(s) 108, using the memory 112 as "working" storage at runtime. A device's computer instructions may be stored in a non-transitory manner in non-volatile memory 112, storage 1118, or an external device(s). Alternatively, some or all of the executable instructions may be embedded in hardware or firmware on the device 102 in addition to or instead of software.

The device 102 may include input/output device interfaces 110. A variety of components may be connected through the input/output device interfaces 110. Additionally, the device 102 may include an address/data bus 1120 for conveying data among components of the respective device. Each component within a device 102 may also be directly connected to other components in addition to, or instead of, being connected to other components across the bus 1120.

The device 102 may include a display, which may comprise a touch interface. Any suitable display technology, such as liquid crystal display (LCD), organic light emitting diode (OLED), electrophoretic, and so on, may be utilized for the displays. Furthermore, the processor(s) 108 may comprise graphics processors for driving animation and video output on the associated display. As a way of indicating to a user that a connection between another device has been opened, the device 102 may be configured with one or more visual indicators, such as the light element(s), which may be in the form of LED(s) or similar components (not illustrated), that may change color, flash, or otherwise provide visible light output, such as for a notification indicator on the device 102. The input/output device interfaces 110 that connect to a variety of components. This wired or a wireless audio and/or video port may allow for input/output of audio/video to/from the device 102. The device 102 may also include an audio capture component. The audio capture component may be, for example, a microphone 114 or array of microphones, a wired headset or a wireless headset, etc. The microphone 114 may be configured to capture audio. If an array of microphones is included, approximate distance to a sound's point of origin may be determined using acoustic localization based on time and amplitude differences between sounds captured by different microphones of the array. The device 102 (using microphone 114, wakeword detection component 1001, ASR component 142, etc.) may be configured to generate audio data corresponding to captured audio. The device 102 (using input/output device interfaces 110, antenna 1104, etc.) may also be configured to transmit the audio data to the system 104 for further processing or to process the data using internal components such as a wakeword detection component 1001.

Via the antenna(s) 1104, the input/output device interface 110 may connect to one or more networks via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Universal Serial Bus (USB) connections may also be supported. Power may be provided to the device 102 via wired connection to an external alternating current (AC) outlet, and/or via onboard power sources, such as batteries, solar panels, etc.

Through the network(s), the system may be distributed across a networked environment. Accordingly, the device 102 and/or the system 104 may include an ASR component 142. The ASR component 142 of device 102 may be of limited or extended capabilities. The ASR component 142 may include language models stored in ASR model storage component, and an ASR component 142 that performs automatic speech recognition. If limited speech recognition is included, the ASR component 142 may be configured to identify a limited number of words, such as keywords detected by the device, whereas extended speech recognition may be configured to recognize a much larger range of words.

The device 102 and/or the system 104 may include a limited or extended NLU component 144. The NLU component 144 of device 102 may be of limited or extended capabilities. The NLU component 144 may comprise a name entity recognition module, an intent classification module and/or other components. The NLU component 144 may also include a stored knowledge base and/or entity library, or those storages may be separately located.

In examples, AEC may also be performed by the device 102. In these examples, the operations may include causing the AEC component 1121 to be enabled or otherwise turned on, or the operations may include causing the AEC component 1121 to transition from a first mode to a second mode representing a higher sensitivity to audio data generated by the microphone 114. The AEC component 1121 may utilize the audio data generated by the microphone 114 to determine if an audio fingerprint of the audio data, or portion thereof, corresponds to a reference audio fingerprint associated with the predefined event. In examples, the AEC component 1121 may utilize one or more of the AED models 126 as described herein.

The device 102 and/or the system 104 may also include a speechlet 1050 that is configured to execute commands/functions associated with a spoken command as described herein. The device 102 may include a wakeword detection component 1001, which may be a separate component or may be included in an ASR component 142. The wakeword detection component 1001 receives audio signals and detects occurrences of a particular expression (such as a configured keyword) in the audio. This may include detecting a change in frequencies over a specific period of time where the change in frequencies results in a specific audio fingerprint that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 102 may be configured collectively to identify a set of the directional audio signals in which the wake expression is detected or in which the wake expression is likely to have occurred.

Figure 12:
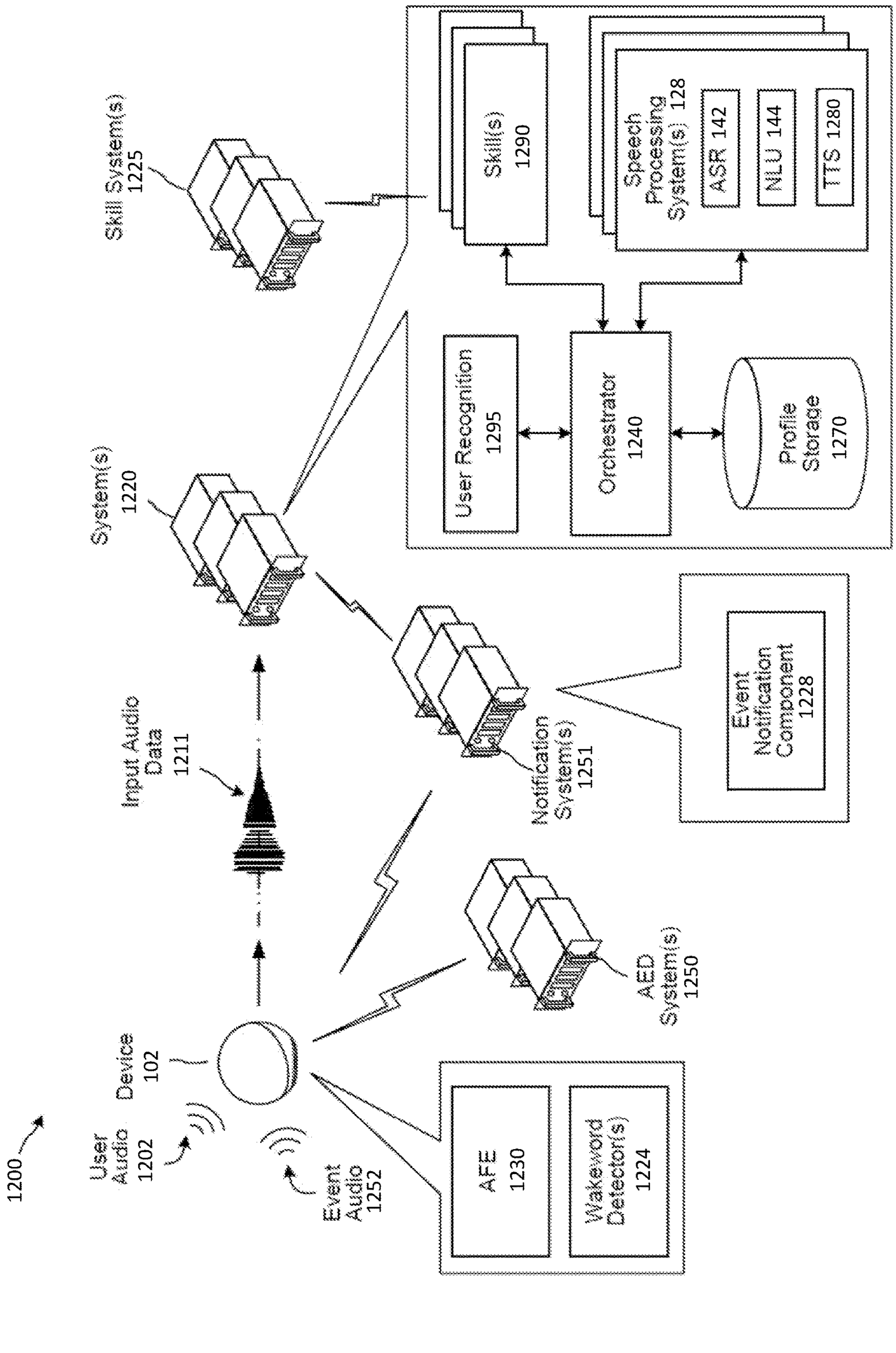
FIG. 12 is conceptual diagram illustrating a system configured for detecting an acoustic event and a system for speech processing.

FIG. 12 is conceptual diagram illustrating a system configured for detecting an acoustic event and a system for speech processing. The system 1200 may operate using various components as described in FIG. 12. The various components may be located on the same or different physical devices. For example, as shown in FIG. 12, some components may be disposed on a device 102, while other components may be disposed on a system(s) 1220; however, some or all of the components may be disposed on the device 102. Communication between various components may thus occur directly (via, e.g., a bus connection) or across the network(s) described herein.

An audio capture component(s), such as a microphone or array of microphones of the device 102, captures input audio, such as the event audio 1252 and/or user audio 1202 (e.g., speech/spoken inputs from a user(s)) and creates corresponding input audio data 1211.

The device 102 may include an acoustic front end (AFE) component 230. The AFE component 230 may be configured to process the audio data 211 and determine acoustic feature data. The AFE component 230 may process the audio data 211 using a number of techniques, such as determining frequency-domain representations of the audio data 211 by using a transform such as a Fast Fourier transform (FFT) and/or determining a Mel-cepstrum corresponding to the audio data 211.

The AFE component 1230 as described in more detail with respect to FIG. 10. In some embodiments, the device 102 may include one AFE component 1230 that may process the audio data 1211 to generate the acoustic feature data to be used by the AED models 126 described herein, and another AFE component 1230 that may process the audio data 1211 to generate acoustic feature data to be used by a wakeword detector 1224. In other embodiments, the AFE component 1230 may generate acoustic feature data that may be used by the AED models 126 and the wakeword detector 1224.

The device 102 may also include one or more wakeword detectors 1224 as described in more detail with respect to FIG. 10. Upon receipt by the system(s) 1220 and/or upon determination by the device 102, the input audio data 1211 may be sent to an orchestrator component 1240. The orchestrator component 1240 may include memory and logic that enables it to transmit various pieces and forms of data to various components of the system, as well as perform other operations as described herein. The orchestrator component 1240 may be or include a speech-processing system manager and/or one or more of the speech-processing systems 128, which may be used to determine which, if any, of the ASR component 142, NLU component 144, and/or TTS component 1280 should receive and/or process the audio data 1211. In some embodiments, the orchestrator component 1240 includes one or more ASR components 142, NLU components 144, TTS components 1280, and/or other processing components, and processes the input audio data 1211 before sending it and/or other data to one or more speech-processing components for further processing.

In some embodiments, the orchestrator 1240 and/or speech-processing system manager communicate with the speech-processing systems using an application programming interface (API). The API may be used to send and/or receive data, commands, or other information to and/or from the speech-processing systems. For example, the orchestrator 1240 may send, via the API, the input audio data 1211 to a speech-processing systems elected by the speech-processing system manager and may receive, from the selected speech-processing system, a command and/or data responsive to the audio data 1211.

If NLU results data includes a single NLU hypothesis, the NLU component 144 may send the NLU results data to the skill component(s) 1290 associated with the NLU hypothesis. If the NLU results data includes an N-best list of NLU hypotheses, the NLU component 144 may send the top scoring NLU hypothesis to a skill component(s) 1290 associated with the top scoring NLU hypothesis. As described above, the NLU component 144 and/or skill component 1290 may determine, using the interaction score, text data representing an indication of a handoff from one speech-processing system to another.

A skill system(s) 1225 may communicate with a skill component(s) 1290 within the system(s) 1220 directly and/or via the orchestrator component 1240. A skill system(s) 1225 may be configured to perform one or more actions. A skill may enable a skill system(s) 1225 to execute specific functionality in order to provide data or perform some other action requested by a user, as described in more detail with respect to FIG. 10.

The system(s) 1220 may include a user-recognition component 1295 that recognizes one or more users associated with data input to the system(s) 1220. The user-recognition component 1295 may take as input the audio data 1211 and/or ASR data output by the ASR component 142. The user-recognition component 1295 may perform user recognition by comparing audio characteristics in the input audio datal 211 to stored audio characteristics of users. The user-recognition component 1295 may also perform user recognition by comparing biometric data (e.g., fingerprint data, iris data, etc.), received by the system in correlation with the present user input, to stored biometric data of users. The user-recognition component 1295 may further perform user recognition by comparing image data (e.g., including a representation of at least a feature of a user), received by the system in correlation with the present user input, with stored image data including representations of features of different users. The user-recognition component 1295 may perform additional user recognition processes, including those known in the art.

The system(s) 1220 may also include profile storage 1270. The profile storage 1270 may include a variety of information related to individual users, groups of users, devices, etc. that interact with the system. The profile storage may be the same or similar to the user registry 130 described with respect to FIG. 1.

The profile storage 270 may include one or more user profiles, with each user profile being associated with a different user identifier. Each user profile may include various user identifying information. Each user profile may also include preferences of the user and/or one or more device identifiers, representing one or more devices of the user. When a user logs into to an application installed on a device 110, the user profile (associated with the presented login information) may be updated to include information about the device 110. As described, the profile storage 270 may further include data that shows an interaction history of a user, including commands and times of The system 1200 may include one or more notification system(s) 1251 which may include an event notification component 1228. Although illustrated as a separate system, notification system(s) 1251 may be configured within system(s) 1220, device 102, or otherwise depending on system configuration. For example, event notification component 1228 may be configured within system(s) 1220, device 102, or otherwise. The event notification component 1228 may handle sending notifications/commands to other devices upon the occurrence of a detected acoustic event. The event notification component 1228 may have access to information/instructions (for example as associated with profile storage 1270 or otherwise) that indicate what device(s) are to be notified upon detection of an acoustic event, the preferences associated with those notifications or other information. The event notification component 1228 may have access to information/instructions (for example as associated with profile storage 1270 or otherwise) that indicate what device(s) are to perform what actions in response to detection of an acoustic event (for example locking a door, turning on/off lights, notifying emergency services, or the like.

Figure 13:
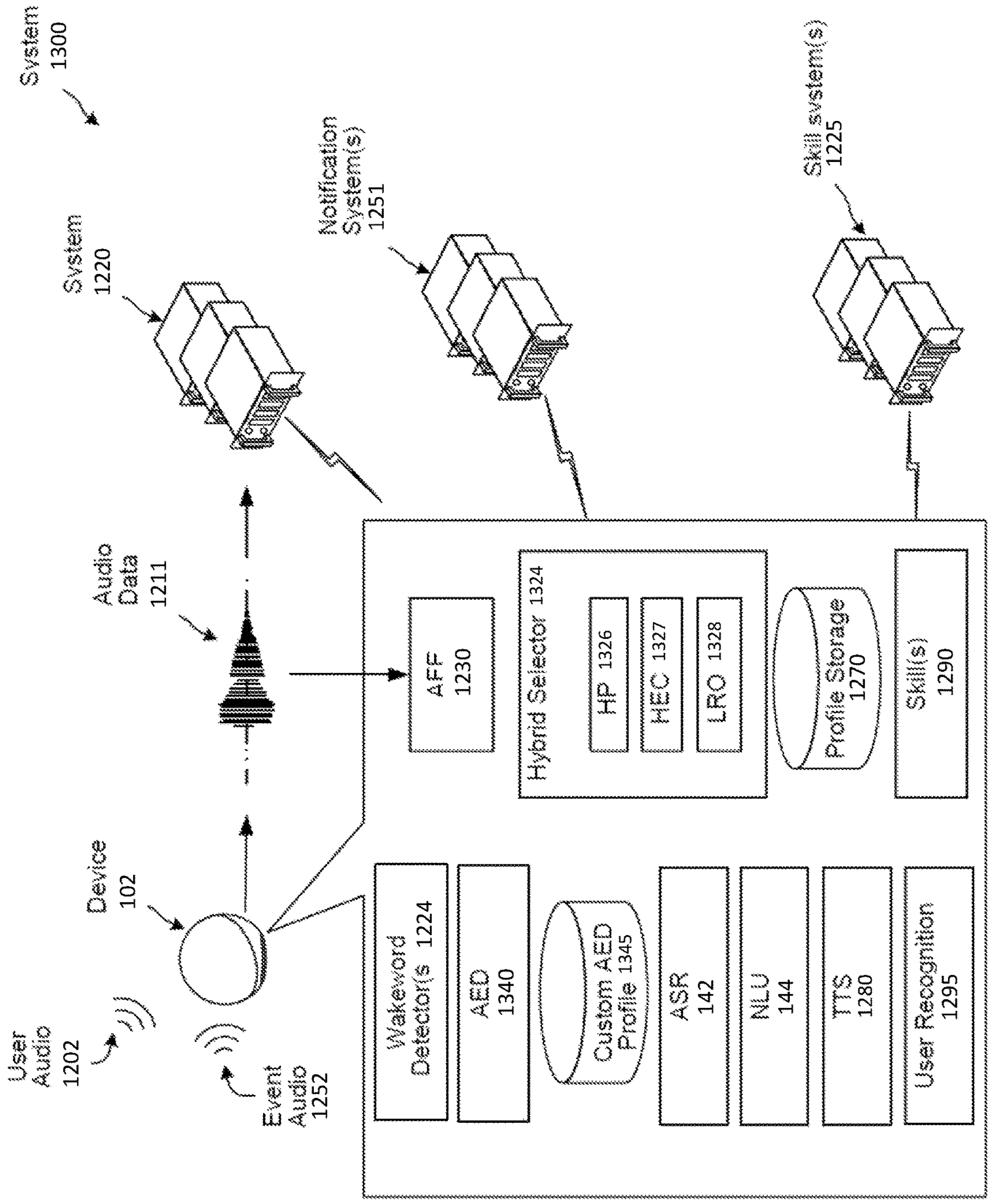
FIG. 13 is a conceptual diagram illustrating components that may be included in a device for AED customization.

The foregoing describes illustrative components and processing of the system(s) 1220. The following describes illustrative components and processing of the device 102. As illustrated in FIG. 13, in at least some embodiments the system(s) 1220 may receive audio data 1211 from the device 102, to recognize speech corresponding to a spoken natural language in the received audio data 1211, and to perform functions in response to the recognized speech. In at least some embodiments, these functions involve sending directives (e.g., commands), from the system(s) 1220 to the device 102 to cause the device 102 to perform an action, such as output synthesized speech (responsive to the spoken natural language input) via a loudspeaker(s), and/or control one or more secondary devices by sending control commands to the one or more secondary devices.

Thus, when the device 102 is able to communicate with the system(s) 1220 over the network(s) described herein, some or all of the functions capable of being performed by the system(s) 1220 may be performed by sending one or more directives over the network(s) to the device 102, which, in turn, may process the directive(s) and perform one or more corresponding actions. For example, the system(s) 1220, using a remote directive that is included in response data (e.g., a remote response), may instruct the device 102 to output synthesized speech via a loudspeaker(s) of (or otherwise associated with) the device 102, to output content (e.g., music) via the loudspeaker(s) of (or otherwise associated with) the device 102, to display content on a display of (or otherwise associated with) the device 102, and/or to send a directive to a secondary device (e.g., a directive to turn on a smart light). It will be appreciated that the system(s) 1220 may be configured to provide other functions in addition to those discussed herein, such as, without limitation, providing step-by-step directions for navigating from an origin location to a destination location, conducting an electronic commerce transaction on behalf of a user as part of a shopping function, establishing a communication session (e.g., an audio or video call) between the user and another user, and so on.

The AFE components 1230 may receive audio data from a microphone or microphone array; this audio data may be a digital representation of an analog audio signal and may be sampled at, for example, 256 kHz. The AED component 1340 may instead or in addition receive acoustic feature data, which may include one or more LFBE and/or MFCC vectors, from the AFE component 1230 as described above. The AFE component 1230 for the AED component 1340 may differ from the AFE component 1230 for the wakeword detector 1224 at least because the AED component 1340 may require a context window greater in size that that of the wakeword detector 1224. For example, the wakeword acoustic-feature data may correspond to one second of audio data, while the AED acoustic-feature data may correspond to ten seconds of audio data.

The wakeword detector(s) 1224 may process the audio data 1211 as described above, and may be configured to detect a wakeword (e.g., "Alexa") that indicates to the device 102 that the audio data 1211 is to be processed for determining NLU output data. In at least some embodiments, a hybrid selector 1324, of the device 102, may send the audio data 1211 to the wakeword detector(s) 1224. If the wakeword detector(s) 1224 detects a wakeword in the audio data 1211, the wakeword detector(s) 1224 may send an indication of such detection to the hybrid selector 1324. In response to receiving the indication, the hybrid selector 1324 may send the audio data 1211 to the system(s) 1220 and/or an on-device ASR component 142. The wakeword detector(s) 1224 may also send an indication, to the hybrid selector 1324, representing a wakeword was not detected. In response to receiving such an indication, the hybrid selector 1324 may refrain from sending the audio data 1211 to the system(s) 1220, and may prevent the on-device ASR component 142 from processing the audio data 1211. In this situation, the audio data 1211 can be discarded.

The device 102 may conduct its own speech processing using on-device language processing components (such as an on-device SLU component, an on-device ASR component 142, and/or an on-device NLU component 144) similar to the manner discussed above with respect to the speech processing system-implemented ASR component 142, and NLU component 144. The device 102 may also internally include, or otherwise have access to, other components such as one or more skills 1290, a user recognition component 1295, profile storage 1270, a TTS component 1280 and other components. In at least some embodiments, the on-device profile storage 1270 may only store profile data for a user or group of users specifically associated with the device 102. Additionally, the device 102 may include an AED component 1340 and a custom AED profile storage 1345.

In at least some embodiments, the on-device language processing components may not have the same capabilities as the language processing components implemented by the system(s) 1220. For example, the on-device language processing components may be configured to handle only a subset of the natural language inputs that may be handled by the speech processing system-implemented language processing components. For example, such subset of natural language inputs may correspond to local-type natural language inputs, such as those controlling devices or components associated with a user's home. In such circumstances the on-device language processing components may be able to more quickly interpret and respond to a local-type natural language input, for example, than processing that involves the system(s) 1220. If the device 102 attempts to process a natural language input for which the on-device language processing components are not necessarily best suited, the NLU output data, determined by the on-device components, may have a low confidence or other metric indicating that the processing by the on-device language processing components may not be as accurate as the processing done by the system(s) 1220.

The hybrid selector 1324, of the device 102, may include a hybrid proxy (HP) 1326 configured to proxy traffic to/from the system(s) 1220. For example, the HP 1326 may be configured to send messages to/from a hybrid execution controller (HEC) 1327 of the hybrid selector 1324. For example, command/directive data received from the system(s) 1220 can be sent to the HEC 1327 using the HP 1326. The HP 1326 may also be configured to allow the audio data 1211 to pass to the system(s) 1220 while also receiving (e.g., intercepting) this audio data 1211 and sending the audio data 1211 to the HEC 1327.

In at least some embodiments, the hybrid selector 1324 may further include a local request orchestrator (LRO) 1328 configured to notify the on-device ASR component 142 about the availability of the audio data 1211, and to otherwise initiate the operations of on-device language processing when the audio data 1211 becomes available. In general, the hybrid selector 1324 may control execution of on-device language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 102 receives directive data from the system(s) 1220 and chooses to use that remotely-determined directive data.

Thus, when the audio data 1211 is received, the HP 1326 may allow the audio data 1211 to pass through to the system(s) 1220 and the HP 1326 may also input the audio data 1211 to the on-device ASR component 142 by routing the audio data 1211 through the HEC 1327 of the hybrid selector 1324, whereby the LRO 1328 notifies the on-device ASR component 142 of the audio data 1211. At this point, the hybrid selector 1324 may wait for response data from either or both the system(s) 1220 and/or the on-device language processing components. However, the disclosure is not limited thereto, and in some examples the hybrid selector 1324 may send the audio data 1211 only to the on-device ASR component 142 without departing from the disclosure. For example, the device 102 may process the audio data 1211 on-device without sending the audio data 1211 to the system(s) 1220.

Figure 14:
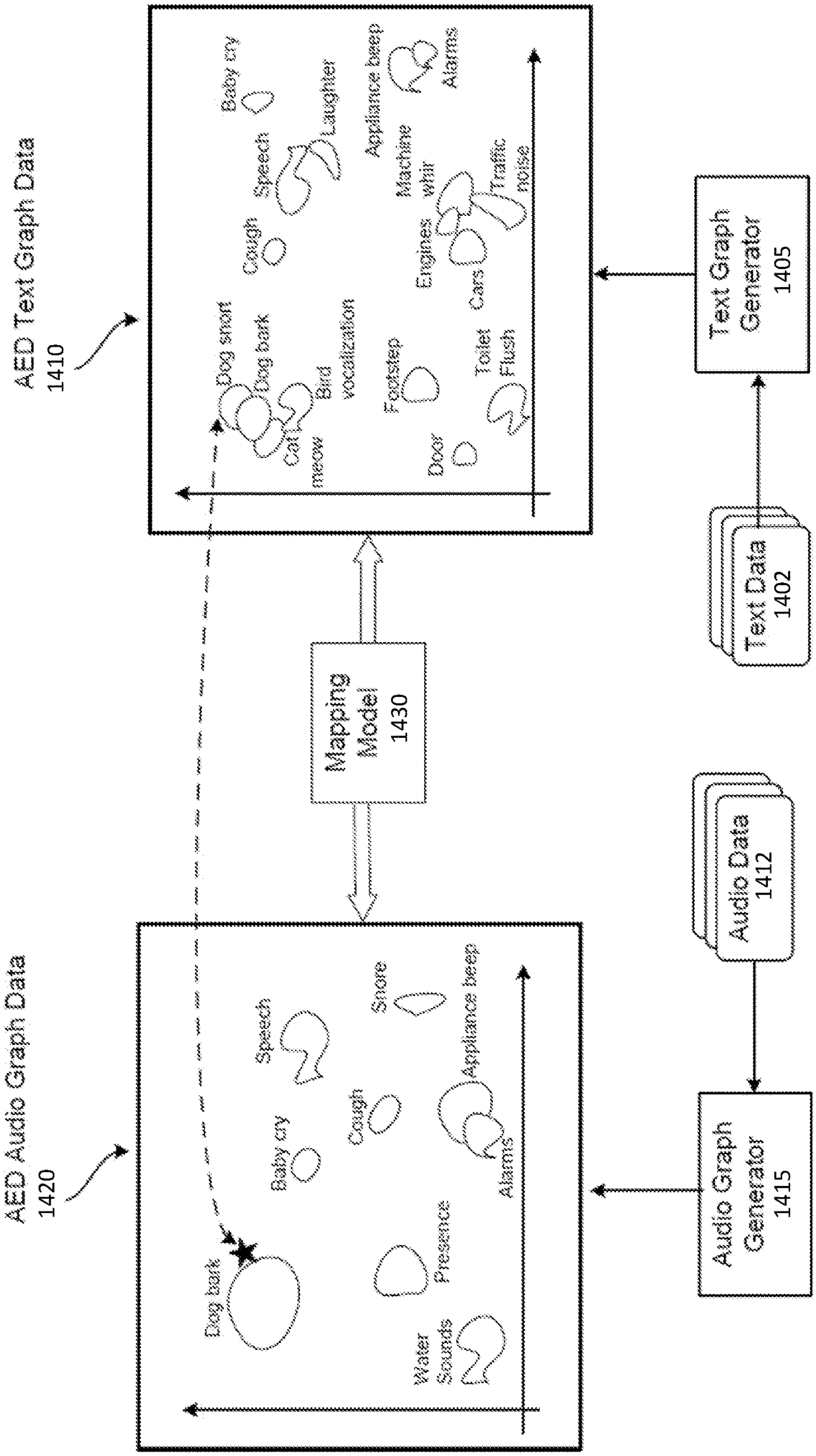
FIG. 14 is a conceptual diagram illustrating audio graph data, text graph data, and how a correspondence between audio and text descriptions are generated.

FIG. 14 illustrates how graph data, that may be stored at AED knowledge storage, may be generated. A text graph generator 1405 may generate AED text graph data 1410 by processing text data 1402. The AED text graph data 1410 may represent relationships between various natural language descriptions for acoustic events based on the semantic meanings of the natural language descriptions. An audio graph generator 1415 may generate AED audio graph data 1420 by processing audio data 1412. The AED audio graph data 1420 may represent relationships between various audio data based on similarities in their corresponding acoustic features. The system may further include a mapping model 1430 to generate mappings between the text data represented in the AED text graph data 1410 and the audio data represented in the AED audio graph data 1420.

As described herein, one graph, AED text graph data 1410, may integrate and represent relationships between natural language descriptions, which may be based on text embeddings or word embeddings. The AED text graph data 1410 may be generated using text data 1402. The text data 1402 may be determined from public sources, such as the Internet, and/or more inputs provided by various users. In some embodiments, the text data 1402 relates to acoustic events, and may not describe non-acoustic events. For example, the text data 1402 may represent "dog barking", "fridge door alarm", "cat meow", etc. In other embodiments, the text data 1402 may encompass various descriptions or words, and a text graph generator 1405 may process the text data 1402 to determine a subset of text data relating to acoustic events only. The text graph generator 1405 may use part-of-speech (POS) tagging, named entity recognition (NER), and/or other techniques to determine text data relating to acoustic events. The text data 1402 may also refer to token data, sub-words, etc.

In some embodiments, an example set of text relating to acoustic events may be used to determine further text data 1402 relating to acoustic events from public sources. For example, starting with the example text "speech", the system may identify a public website that describes "speech", and then use POS tagging and/or NER based methods to extract words/entities related to "speech" from the website. For example, text such as "human vocal communication", "language", "lexicon of a language", "vocalization", etc. may be extracted from the website. The system may use one or more gating mechanisms that select the text that have high semantic similarities with the example text. In this manner, acoustic event-specific text data is extracted from public sources to maximize the richness of the text, evaluated by the text graph generator 1405, while not including many irrelevant texts. The text graph generator 1405 may use the determined words/entities as new nodes for the AED text graph data 1410 when they are determined to be acoustic event relevant. The text corpus, for the AED text graph data 1410, may be expanded by following related web pages, NER of existing text data/web pages, etc. as one acoustic event description can lead to discovery of multiple others during the search of relevant text data on the Internet.

Additionally, in some embodiments, user inputs may be used to contribute to the text corpus used to generate the AED text graph data 1410. For example, a user may provide natural language descriptions of various different acoustic events through spoken inputs, using a companion application of the AED system(s) 1250, etc. Such user inputs may be anonymized and may not be associated with a user identifier, a device identifier, or other identifying information. Additionally, in some embodiments, user inputs provided when configuring the AED system(s) 1250 to detect custom acoustic events may be used to generate the AED text graph data 1410.

The determined AED-specific text corpus (e.g., the text data 1402) may be used to fine-tune one or more generic text embedding models such that the structural relationships of different acoustic events are preserved. The fine-tuned text embedding model may then be used to encode the determined text data 1402 into semantic representations, which may be vector data with a fixed dimension. The encoded text data may be used to build the vertices of the AED text graph data 1410, which may reflect the high-level relationship between different acoustic events. In some embodiments, a vertex between acoustic event A and acoustic event B is determined to be valid by measuring the distance between the vector data/semantic representations of A and B (e.g., Euclidean distance of the two vectors) against a condition (e.g., a dynamic threshold) for similarity measure.

The text graph generator 1405 may determine text embeddings for a natural language description for an acoustic event. In some embodiments, a word2vec technique may be used (that generates a 300 dimensional vector representation), and when the natural language description includes multiple words, an average of the vectors for the individual words may be used as the text embedding for the description. In other embodiments, the text graph generator 1405 may employ a universal sentence encoder (e.g., that generates a 512 dimensional vector). In yet other embodiments, the text graph generator 1405 may employ a tokenizer to identify words that are nouns, verbs or adjectives from the text corpus, and select words with high cosine similarities with respect to the corresponding labels using their vector representations. Then the average of the vector representations of the selected words weighted by their occurrences in the text corpus. This POS tagging-based word selection method makes the text embedding invariant to the order of concatenation of texts from various sources or multiple web pages. The text embeddings may be referred to as word embeddings, in some cases, and may correspond to subwords, token data, etc.

In some embodiments, the audio data 1412 relates to acoustic events and may have natural language descriptions that are included in the text data 1402. The mapping model 1430 is trained using labeled mappings between a portion of the audio data 1412 and a portion of the text data 1402. Not all of the descriptions represented in the text data 1402 may have corresponding audio data, and not all of the audio data 1412 may have a corresponding description. The mapping model 1430 may process the AED text graph data 1410 and the AED audio graph data 1420 to determine bi-linear mappings between text embeddings that do not have a mapping to an audio embedding.

In some embodiments, the audio embeddings may be extracted from log mel spectrogram features of the audio data 1412. In some embodiments, the mapping model 1430 may use a dense layer (e.g., a 527-unit dense layer) with a sigmoid activation along with an audio encoder may be used to extract audio embeddings corresponding to the audio data 1412. The mapping model 1430 may be configured using a two-view alignment loss between text embeddings and audio embeddings as a regularizer to the supervised loss. In some embodiments, cosine similarity may be enforced for the multi-view alignment. In other embodiments, linear canonical correlation analysis loss may be used. An example overall loss equation is shown below, where a hyper-parameter α to adjust the relative importance of the supervised cross-entropy loss $L_{sup}$ and the embedding alignment loss $L_{cons}$:

$$L = E_i\left\{L_{sup}(\hat{y}_i, y_i) + \alpha\frac{1_{r\in Eve(i)}L_{cons}(E_i, Me_i^r)}{\sum_r 1_{r\in Eve(i)}}\right\} \tag{1}$$

-continued $$L_{sup} = y_i^T \cdot \log\hat{y}_i + \left(1 - y_i^T\right)\cdot\log(1 - \hat{y}_i) \tag{2}$$

$$L_{cons} = \frac{E_i \cdot Me_i^r}{\|E_i\|\cdot\|Me_i^r\|} \tag{3}$$

In equation (1) above, Eve(i) is the set of events present in audio i. The label description is $y_i$, the predicted description is $\hat{y}_i$, the audio embedding is $E_i$ and the text embedding is $e_i$. M is a matrix used to map the text embeddings into the same shape/space as the audio embeddings, which is shared across all the acoustic events. In equation (1) one acoustic event (amongst all events present in the label) is chosen at random (denoted as r in equations (1) and (3)) and use its text embeddings to calculate $L_{cons}$. As the number of epochs becomes sufficiently large, the stochastic implementation approximately converges to equation (1). The supervised loss $L_{sup}$ is updated regularly with all events present in each sample.

After the mapping model 1430 is trained, it may be used to process audio data 1412 that does not have a bi-linear mapping. At inference time, the mapping model 430 may process first audio data 1412 to determine first text data 1402 that represents a natural language description of the first audio data 1412. The bi-linear mappings between the audio data 1412 and the text data 1402 may be stored at the AED knowledge graph storage. In some embodiments, the bi-linear mappings may be stored as data representing an association/correspondence between an audio embedding and a text embedding.

The stored bi-linear mappings can then be used to determine audio data corresponding to a user-provided natural language description for a custom acoustic event. That is, the AED system(s) 1250 may determine a natural language description (e.g., as provided by the user or a refined version of the user-provided description), determine a text embedding corresponding to the natural language description, and determine a first node in the AED text graph data 1410 that is semantically similar to the text embedding. Using the bi-linear mappings, the AED system(s) 1250 may determine a second node in the AED audio graph data 1420 that is associated with the first node in the AED text graph data 1410, and may use the audio data/audio embedding (e.g., the audio data 1412) corresponding to the second node as a potential sample of the custom acoustic event described by the user.

When a user-provided natural language description is determined to be a novel node that is not already represented in the AED text graph data 1410 (e.g. a user says "Alexa, I want to build a custom sound detector for my puppy dog whimper,"), the system determines an estimated degree of the node to determine how to insert the novel node into the AED text graph data 1410. For example, "animal" may be a 'super-category' with the highest degree, "dog sound" and "cat sound" may be its 'sub-categories' that branch into multiple children nodes, and "dog bark" and "cat hiss" may be 'leaf nodes' which do not have children nodes. When a super-category is discovered, then some clusters may be broken up into smaller sub-graphs in order to fit in a new concept. On the other hand, when a leaf node is discovered, it is appended to end of an appropriate branch.

The AED text graph data 1410 can be used to provide reference semantics in a "text view" to support various audio tasks when limited or no audio samples are available. For example, concept clusters can be built in both audio and text views. As text data is more readily available (from public sources), the concept clusters may be denser and more accurate in the text view than in the audio view. Using existing audio and text pairs, the mapping model 1430 may be trained to determine a bi-linear mapping between the two views. Therefore, when expanding to a new acoustic event, the text representation and the learned bi-linear mapping can be used to estimate its audio representation. For acoustic events that share common "low-level" acoustic features, for example, "cat sound" and "dog sound" are both produced through the same biological pathway (i.e. lung→vocal fold→oral cavity→lips) and their sounds share similar sound production mechanism, the mapping model 1430 can generalize well in generating the bi-linear mappings.

In some cases, the AED text graph data 1410 can be used for making manual annotations for custom acoustic events more efficient. Because the AED text graph data 1410 has a top-down structure, where a sub-graph or cluster embodies the concept of a "super-category" and the leaf nodes represent the more fine-grained description to summarize the target acoustic event, this can be leveraged this to help the manual annotators make faster decisions. With the AED text graph data 1410 and the bi-linear map, a few plausible annotation paths can be predicted to assist the annotators to find the best descriptions for acoustic events present in an audio clip. Given a pair of audio embedding and text description, the system can propose top N paths for plausible events based on the likelihoods in a top-down order (super-category→sub-category→leaf node). For example, if an audio contains "dog cry", the system may propose the following few paths:

animal sound→domestic pets→dog sound→dog bark→dog cry→puppy dog cry;

animal sound→domestic pets→dog sound→dog bark→dog whimper→multiple dog whimper→multiple dog whimper and bark;

animal sound→domestic pets→cat sound→cat meow→cat meow and hiss.

The AED text graph data 1410 may be updated based on user inputs provided by multiple users. For example, the AED text graph data 1410 may be updated to include natural language descriptions provided by the user that are not already represented in the AED text graph data 1410. The AED audio graph data 1420 may be updated based on event audio (e.g. the event audio) that occurred in multiple user environments. For example, the AED audio graph data 1420 may be updated to include audio embeddings that are not already represented in the AED audio graph data 1420. The updated AED graph data may be used to process subsequently received user inputs requesting configuration of custom acoustic event detection. For example, a first user may provide a natural language description for a sound made by a particular brand of appliance, and the AED system(s) 1250 may capture event audio representing the sound made by the particular brand of appliance. The natural language description and the event audio may be integrated in the respective AED graph data 1410, 1420, so that when a second user requests detection of the sound made by the particular brand of appliance, the AED system(s) 1250 can retrieve audio embedding data corresponding to the previously received event audio, and use the audio embedding data to detect occurrence of the sound made by the particular brand of appliance in the second user's environment.

Figure 15:
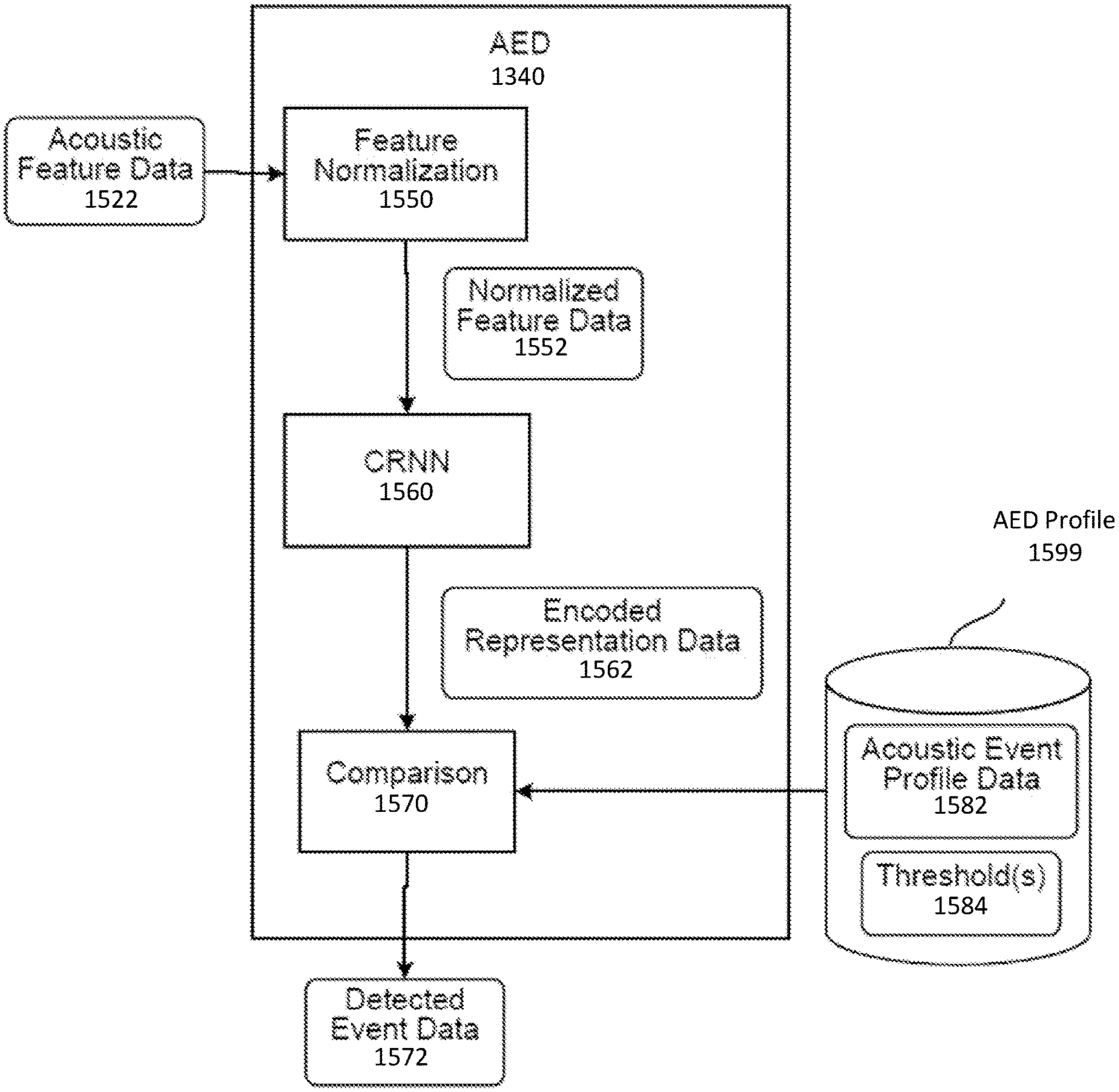
FIG. 15 is a conceptual diagram illustrating components of an AED component as utilized herein.

FIG. 15 illustrates components of the AED component 1340. As shown, the AED component 1340 may include a feature normalization component 1550, a CRNN 1560, and a comparison component 1570. These components may be configured to detect custom acoustic events defined by the user of the devices 102.

The feature normalization component 1550 may process the acoustic feature data 1522 and may determine normalized feature data 1552. The feature normalization component 1550 may process the acoustic feature data 1522, and may perform some normalization techniques. Different environments (e.g., homes, offices, buildings, etc.) have different background noises and may also generate event audio at different levels, intensities, etc. The feature normalization component 1550 may process the acoustic feature data 1522 to remove, filter, or otherwise reduce the effect, of any environmental differences that may be captured by the device 102 in the event audio, on the processing performed by the CRNN 1560 and the comparison component 1570. The feature normalization component 1550 may use a normalization matrix derived by performing statistical analysis on audio samples corresponding to a wide range of acoustic events.

The CRNN 1560 may be an encoder that generates encoded representation data 1562 using the normalized feature data 1552. The CRNN 1560 may include one or more convolutional layers followed by one or more recurrent layer(s) that may process the normalized feature data 1552 to determine one or more probabilities that the audio data includes one or more representations of one or more acoustic events. The CRNN 1560 may include a number of nodes arranged in one or more layers. Each node may be a computational unit that has one or more weighted input connections, a transfer function that combines the inputs in some way, and an output connection. The CRNN 1560 may include one or more recurrent nodes, such as LSTM nodes, or other recurrent nodes, such as gated rectified unit (GRU) noes. For example, the CRNN 1560 may include 128 LSTM nodes; each LSTM node may receive one feature vector of the acoustic feature data during each frame. For next frames, the CRNN 1560 may receive different sets of 128 feature vectors (which may have one or more feature vectors in common with previously-received sets of feature vectors—e.g., the sets may overlap). The CRNN 1560 may periodically reset every, for example, 10 seconds. The CRNN 1560 may be reset when a time of running the model (e.g., a span of time spent processing audio data) is greater than a threshold time. Resetting of the CRNN 1560 may ensure that the CRNN 1560 does not deviate from the state to which it had been trained. Resetting the CRNN 1560 may include reading values for nodes of the model—e.g., weights—from a computer memory and writing the values to the recurrent layer(s).

The CRNN 1560 may be trained using ML techniques and training data. The training data, for the CRNN 1560, may include audio samples of a wide variety of acoustic events (e.g., sounds from different types/brands of appliances, sounds of different types of pets, etc.). The training data may further include annotation data indicating which acoustic events are of interest and which acoustic events are not of interest. The CRNN 1560 may be trained by processing the training data, evaluating the accuracy of its response against the annotation data, and updating the recurrent layer(s) via, for example, gradient descent. The CRNN 1560 may be deemed trained when it is able to predict occurrence of acoustic events of interest in non-training data within a required accuracy.

The CRNN 1560 may be configured to generate encoded representation data that can be used to detect a wider range of acoustic events, so that the CRNN 1560 can be used to detect any custom acoustic event taught by the user.

The CRNN 1560 may thus receive the acoustic-feature data and, based thereon, determine an AED probability, which may be one or more numbers indicating a likelihood that the acoustic-feature data represents the acoustic event. The AED probability may be, for example, a number that ranges from 0.0 to 1.0, wherein 0.0 represents a 0% likelihood that the acoustic-feature data represents the acoustic event, 1.0 represents a 100% likelihood that the acoustic-feature data represents the acoustic event, and numbers between 0.0 and 1.0 represent varying degrees of likelihood that the acoustic-feature data represents the acoustic event. A value of 0.75, for example, may correspond to 75% confidence in the acoustic-feature data including a representation of the acoustic event. The AED probability may further include a confidence value over time and may indicate at which times in the acoustic-feature data that the acoustic event is more or less likely to be represented.

A number of activation function components—one for each acoustic event—may be used to apply an activation function to the probability of occurrence of that event output by the recurrent layer(s). The activation function may transform the probability data such that probabilities near 50% are increased or decreased based on how far away from 50% they lie; probabilities closer to 0% or 100% may be affected less or even not at all. The activation function thus provides a mechanism to transform a broad spectrum of probabilities—which may be evenly distributed between 0% and 100%—into a binary distribution of probabilities, in which most probabilities lie closer to either 0% or 100%, which may aid classification of the probabilities as to either indicating an acoustic event or not indicating an acoustic event by an event classifier. In some embodiments, the activation function is a sigmoid function.

In some embodiments, the CRNN 1560 may be configured to convert a higher dimensional feature vector (the normalized feature data 1552) to a lower dimensional feature vector (the encoded representation data 1562). The CRNN 1560 may process multiple frames of acoustic feature data 1522, represented in the normalized feature data 1552, corresponding to an acoustic event and may ultimately output a single N-dimensional vector that uniquely identifies the event. That is, a first N-dimensional vector is first encoded representation data that represents a first predetermined acoustic event, a second N-dimensional vector is second encoded representation data that represents a second predetermined acoustic event, and so on. The N-dimensional vectors may correspond to points in an N-dimensional space known as an embedding space or feature space; in this space, data points that represent similar-sounding events are disposed closer to each other, while data points that represent different-sounding events are disposed further from each other. The CRNN 1560 may be configured by processing training data representing a variety of events; if the CRNN 1560 processes two items of audio data from two events known to be different, but maps them to similar points in the embedding space, the CRNN 1560 is re-trained so that it maps the training data from the different events to different points in the embedding space. Similarly, if the CRNN 1560 processes two items of audio data from two events known to be similar, but maps them to different points in the embedding space, the CRNN 1560 is re-trained so that it maps the training data from the similar events to similar points in the embedding space.

The comparison component 1570 may be configured to process the encoded representation data 1562 with respect to one or more acoustic event profile data 1582 using a corresponding threshold 1584. As described herein, the custom AED profile storage 1599 may store the acoustic event profile data 1582 and the corresponding threshold 1584 based on the user configuring the AED system(s) 1250 to identify a custom acoustic event. Each of the acoustic event profile data 1582 may be acoustic feature data corresponding to a single individual custom acoustic event. For example, first acoustic event profile data 1582*a* may correspond to a custom doorbell sound, second acoustic event profile data 1582*b* may correspond to a particular breed dog bark, etc. Each of the thresholds 1584 may be a threshold value of similarity, and may correspond to a single individual custom acoustic event. For example, a first threshold 1584*a* may be a first threshold value corresponding to the first acoustic event profile data 1582*a*, a second threshold 1584*b* may be a second threshold value corresponding to the second acoustic event profile data 1582*b*, etc.

The comparison component 1570 may process the encoded representation data 1562 with respect to each of the acoustic event profile data 1582, and may determine how similar the encoded representation data 1562 is to the acoustic event profile data 1582. The comparison component 1570 may determine such similarity using various techniques, for example, using a cosine similarity, using a number of overlapping data points within a feature space, using a distance between data points within a feature space, etc. The comparison component 1570 may determine that the encoded representation data 1562 corresponds to the custom acoustic event represented in the acoustic event profile data 1582 when the similarity satisfies the corresponding threshold 1584. The similarity may be represented as one or more numerical values or a vector of values, and the threshold 1584 may be represented as single numerical value. In some embodiments, the average of the similarity values may exceed/satisfy the threshold 1584 for the comparison component 1570 to determine that the corresponding custom acoustic event occurred. As described herein, the encoded representation data 1562 is a vector and the acoustic event profile data 1582 is a vector, and in some embodiments, if each of the values of the encoded representation data 1562 (e.g., each of the values of the N-vector) are within the threshold 1584 of each of the corresponding values of the acoustic event profile data 1582, the comparison component 1570 may determine that the corresponding custom acoustic event occurred.

The comparison component 1570 may evaluate the encoded representation data 1562 with respect to each of the acoustic event profile data 1582, and may determine, in some cases, that more than one custom acoustic event is represented in the event audio. For example, the comparison component 1570 may process the encoded representation data 1562 with respect to the first acoustic event profile data 1582*a* to determine first similarity data that satisfies the first threshold 1584*a*, and may process (in parallel) the encoded representation data 1562 with respect to the second acoustic event profile data 1582*b* to determine second similarity data that satisfies the second threshold 1584*b*, and may then determine, based on both of the first and second thresholds 1584 being satisfied, that the first and second custom acoustic events occurred.

The AED component 1340 may output detected event data 1572 representing one or more custom acoustic events occurred based on processing the event audio. The detected event data 1572 may be an indication (e.g., a label, an event identifier, etc.) of the custom acoustic event represented in the event audio. For example, the detected event data 1572 may be data indicating that a dog barking event occurred. In some cases, the event audio may represent more than one event occurrence, and the detected event data 1572 may indicate that more than one of the custom acoustic events occurred. For example, the detected event data 1572 may be data indicating that a dog barking event and a fridge door alarm event occurred. If the event audio does not correspond to any of the custom acoustic events, then the detected event data 1572 may be null, may indicate "other" or the like.

In some embodiments, the detected event data 1572 may correspond to a portion of the event audio, for example, a set of audio frames that are processed by the AED component 1340. The AED system(s) 1250 may include an event detection component that may aggregate the results (e.g., detected event data) of the AED component 1340 processing sets of audio frames of the event audio data corresponding to the event audio. The event detection component may perform further processing on the aggregated results/detected event data to determine an acoustic event represented in the event audio. Such further processing may involve normalizing, smoothing, and/or filtering of the results/detected event data.

In some embodiments, the AED component 1340 may determine the detected event data 1572 in a number of different ways. If multiple samples of the custom acoustic event is used/stored in the acoustic event profile data 1582, the AED component 1340 may encode each sample to a different point in the embedding space. The different points may define an N-dimensional shape; the comparison component 1570 may deem that the encoded representation data 1562 defines a point within the shape, or within a threshold distance of a surface of the shape, and thus, indicates occurrence of the corresponding custom acoustic event. In other embodiments, the AED component 1340 may determine a single point that represents the various points determined from the various samples of the custom acoustic event. For example, the single point may represent the average of each of the values corresponding to the samples. The single point may further represent the center of the shape defined by the points.

The comparison component 1570 may output the detected event data 1572 indicating which, if any, of the custom acoustic events (indicated in the custom AED profile storage 1599) occurred based on processing of the event audio. The detected event data 1572 may include one or more labels or indicators (e.g., Boolean values such as 0/1, yes/no, true/false, etc.) indicating whether and which of the custom acoustic events occurred. In some embodiments, each of the acoustic event profile data 1582 may be associated with an event identifier (e.g., a numerical identifier or a text identifier), and the detected event data 1572 may include the event identifier along with the label/indicator.

The AED component 1340 may output an indication of detection of a custom acoustic event as the detected event data 1572. Such detected event data 1572 may include an identifier of the custom acoustic event, a score corresponding to the likelihood of the custom acoustic event occurring, or other related data. Such detected event data 1572 may then be sent, over the network(s), to a downstream component, for example notification system(s) 1251/event notification component 1228 or another device.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A system, comprising:

one or more processors; and non-transitory computer-readable media storing computer-executable instructions that, when executed by the one or more processors, cause the one or more processors to perform operations comprising:

storing first data representing acoustic event detection (AED) models, a first AED model of the AED models configured to detect a first acoustic event when represented in audio data, a second AED model of the AED models configured to detect a second acoustic event when represented in the audio data;

determining that user account data indicates devices associated with the user account data have been enrolled in one or more device functionalities associated with the first acoustic event;

selecting, from second data indicating historic AED performed on the devices, a first device of the devices to be utilized to detect the first acoustic event;

sending, to the first device and in response to the user account data indicating the devices have been enrolled in one or more device functionalities associated with the first acoustic event, third data representing the first AED model instead of the second AED model;

determining, from fourth data indicating times of day when the first device detects the first acoustic event utilizing the first AED model, a time range for when the first AED model is to be activated, wherein the time range is determined from the times of day indicating a pattern of detecting the first acoustic event during the time range and from a pattern of lack of detections of the first acoustic event at times other than the time range; and sending fifth data to the first device, the fifth data indicating an activation schedule for when the first AED model is to be queried to analyze sample audio data to detect the first acoustic event.

2. The system of claim 1, the operations further comprising:

sending the third data representing the first AED model to a second device of the devices;

receiving, during a period of time, sixth data indicating a first number of times that the second device detected the first acoustic event utilizing the first AED model;

determining that the first number of times fails to satisfy a threshold number of times; and sending, to the second device, a command configured to cause the first AED model to be deleted from the second device.

3. The system of claim 1, the operations further comprising:

determining that the first device is associated with an environment where a second device of the devices is situated;

determining that the user account data indicates the second AED model is to be utilized by at least one of the devices;

determining a first amount of first data storage being utilized by the first device;

determining a second amount of second data storage being utilized by the second device;

determining that the first amount exceeds the second amount; and selecting the second device to utilize the second AED model instead of the first device based at least in part on the first amount exceeding the second amount.

4. The system of claim 1, the operations further comprising:

sending the first AED model to a second device of the devices;

receiving sixth data indicating that the first device detected the first acoustic event at a time when the second device detected the first acoustic event; and sending a command to the first device, the command configured to cause the first AED model to be deleted from the first device in response to the first device detecting the first acoustic event at the time when the second device detected the first acoustic event.

5. A method, comprising:

selecting, based at least in part on first data indicating configuration of devices associated with user account data, a first acoustic event detection (AED) model of multiple AED models to be utilized by a first device of the devices;

determining that the first device is likely to detect a first acoustic event utilizing the first AED model based at least in part on second data indicating historical detection of the first acoustic event;

sending, to the first device and based at least in part on the first device being likely to detect the first acoustic event utilizing the first AED model, third data representing the first AED model;

determining, based at least in part on fourth data indicating when the first device detects the first acoustic event utilizing the first AED model, an activation trigger for when the first AED model is to be activated by the first device;

sending fifth data indicating the activation trigger to the first device, the fifth data causing the first device to activate the first AED model based at least in part on the activation trigger;

determining that the first device is associated with an environment where a second device of the devices is situated;

determining that the user account data indicates a second AED model of the multiple AED models is to be utilized by at least one of the devices;

determining a first amount of first data storage being utilized by the first device;

determining a second amount of second data storage being utilized by the second device;

determining that the first amount exceeds the second amount; and selecting the second device to utilize the second AED model instead of the first device based at least in part on the first amount exceeding the second amount.

6. The method of claim 5, further comprising:

sending the third data representing the first AED model to a second device of the devices;

receiving sixth data indicating a first number of times that the second device detected the first acoustic event utilizing the first AED model;

determining that the first number of times fails to satisfy a threshold number of times; and sending, to the second device, a command configured to cause the second device to delete the first AED model.

7. The method of claim 5, further comprising:

receiving sixth data indicating when the first acoustic event is detected using the first AED model on the first device;

receiving seventh data indicating an environmental condition identified in association with the first acoustic event being detected on the first device; and wherein determining the activation trigger comprises determining the activation trigger based at least in part on when the environmental condition is identified.

8. The method of claim 5, further comprising:

sending the first AED model to a second device of the devices;

receiving sixth data indicating that the first device detected the first acoustic event at a time when the second device detected the first acoustic event; and sending a command to the first device, the command configured to cause the first AED model to be deleted from the first device.

9. The method of claim 5, further comprising:

determining, based at least in part on the user account data, a configuration of the first device, the configuration of the first device indicating at least one of hardware or software components of the first device associated with performing AED; and wherein selecting the first AED model to be utilized by the first device comprises selecting the first AED model to be utilized by the first device based at least in part on the configuration of the first device.

10. The method of claim 5, further comprising determining, from sixth data indicating times of day when the first device detects the first acoustic event utilizing the first AED model, a time range for when the first AED model is to be activated, wherein the time range is determined from the times of day indicating a pattern of detecting the first acoustic event during the time range and from a pattern of lack of detections of the first acoustic event at times other than the time range.

11. The method of claim 5, further comprising:

receiving sixth data indicating that the first acoustic event has not been detected on the first device within a threshold amount of time;

determining, based at least in part on the sixth data, that the first acoustic event is associated with a predefined acoustic event type; and determining, based at least in part on the first acoustic event being associated with the predefined acoustic event type, to refrain from sending a command to the first device to cause the first AED model to be deleted from the first device.

12. The method of claim 5, further comprising:

determining that a second device of the devices has detected a second acoustic event utilizing a second AED model of the AED models;

determining that the second AED model is associated with the first AED model; and sending the third data representing the first AED model to the second device based at least in part on the second AED model being associated with the first AED model.

13. A system, comprising:

one or more processors; and non-transitory computer-readable media storing computer-executable instructions that, when executed by the one or more processors, cause the one or more processors to perform operations comprising:

selecting, based at least in part on first data indicating configuration of the devices associated with user account data, a first acoustic event detection (AED) model of multiple AED models to be utilized by a first device of the devices;

determining that the first device is likely to detect a first acoustic event utilizing the first AED model based at least in part on second data indicating historical detection of the first acoustic event;

sending, to the first device and based at least in part on the first device being likely to detect the first acoustic event utilizing the first AED model, third data representing the first AED model;

determining, based at least in part on fourth data indicating when the first device detects the first acoustic event utilizing the first AED model, an activation trigger for when the first AED model is to be activated by the first device;

sending fifth data indicating the activation trigger to the first device, the fifth data causing the first device to activate the first AED model based at least in part on the activation trigger;

determining that the first device is associated with an environment where a second device of the devices is situated;

determining that the user account data indicates a second AED model of the multiple AED models is to be utilized by at least one of the devices;

determining a first amount of first data storage being utilized by the first device;

determining a second amount of second data storage being utilized by the second device;

determining that the first amount exceeds the second amount; and selecting the second device to utilize the second AED model instead of the first device based at least in part on the first amount exceeding the second amount.

14. The system of claim 13, the operations further comprising:

sending the third data representing the first AED model to a second device of the devices;

receiving sixth data indicating a first number of times that the first AED model detected the first acoustic event on the second device;

determining that the first number of times fails to satisfy a threshold of times; and sending, to the second device, a command configured to cause the second device to delete the first AED model.

15. The system of claim 13, the operations further comprising:

receiving sixth data indicating when the first acoustic event is detected using the first AED model on the first device;

receiving seventh data indicating an environmental condition identified when the first acoustic event is detected on the first device; and wherein determining the activation trigger comprises determining the activation trigger based at least in part on when the environmental condition is identified.

16. The system of claim 13, the operations further comprising:

sending the first AED model to a second device of the devices;

receiving sixth data indicating that the first device detected the first acoustic event at a time when the second device detected the first acoustic event; and sending a command to the first device, the command configured to cause the first AED model to be deleted from the first device.

17. The system of claim 13, the operations further comprising:

determining, based at least in part on the user account data, a configuration of the first device, the configuration of the first device indicating at least one of hardware or software components of the first device associated with performing AED; and wherein selecting the first AED model to be utilized by the first device comprises selecting the first AED model to be utilized by the first device based at least in part on the configuration of the first device.

18. The system of claim 13, the operations further comprising: determining, from sixth data indicating times of day when the first device detects the first acoustic event utilizing the first AED model, a time range for when the first AED model is to be activated, wherein the time range is determined from the times of day indicating a pattern of detecting the first acoustic event during the time range and from a pattern of lack of detections of the first acoustic event at times other than the time range.

19. The system of claim 13, the operations further comprising:

receiving sixth data indicating that the first acoustic event has not been detected on the first device within a threshold amount of time;

determining, based at least in part on the sixth data, that the first acoustic event is associated with a predefined acoustic event type; and determining, based at least in part on the first acoustic event being associated with the predefined acoustic event type, to refrain from sending a command to the first device to cause the first AED model to be deleted from the first device.

20. The system of claim 13, the operations further comprising:

determining that a second device of the devices has detected a second acoustic event utilizing a second AED model of the AED models;

determining that the second AED model is associated with the first AED model; and sending the third data representing the first AED model to the second device based at least in part on the second AED model being associated with the first AED model.

* * * * *